US012635837B2

(12) United States Patent
Choi et al.

(10) Patent No.: US 12,635,837 B2
(45) Date of Patent: May 26, 2026

(54) ROBOTIC VACUUM CLEANER, DOCKING STATION, AND CLEANING SYSTEM INCLUDING THE SAME

(71) Applicant: SAMSUNG ELECTRONICS CO., LTD., Suwon-si (KR)

(72) Inventors: Hongseok Choi, Suwon-si (KR); Sunghyun Kim, Suwon-si (KR); Elijah Kim, Suwon-si (KR); Juyeong Kim, Suwon-si (KR); Junwon Seo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 463 days.

(21) Appl. No.: 18/143,319

(22) Filed: May 4, 2023

(65) Prior Publication Data

US 2024/0023770 A1      Jan. 25, 2024

Related U.S. Application Data

(63) Continuation of application No. PCT/KR2023/005953, filed on May 2, 2023.

(30) Foreign Application Priority Data

Jul. 22, 2022    (KR) ........................ 10-2022-0091122

(51) Int. Cl.
*A47L 9/00*       (2006.01)
*A47L 9/28*       (2006.01)
(Continued)

(52) U.S. Cl.
CPC ........... *A47L 9/0063* (2013.01); *A47L 9/2873* (2013.01); *A47L 11/282* (2013.01);
(Continued)

(58) Field of Classification Search
CPC ........ A47L 9/00; A47L 9/0009; A47L 9/0063; A47L 9/28; A47L 9/2868; A47L 11/4091;
(Continued)

(56) References Cited

U.S. PATENT DOCUMENTS 9,717,383 B2      8/2017   Conrad
2014/0228398 A1      8/2014   Di Paolo et al.
(Continued)

FOREIGN PATENT DOCUMENTS

CN      110123216 B      11/2020
CN      211933914 U   *   11/2020   .......... A47L 11/4091
(Continued)

OTHER PUBLICATIONS

International Search Report, PCT/ISA/210, issued on Jul. 26, 2023, in International Patent Application No. PCT/KR2023/005953.
Written Opinion, PCT/ISA/237, issued on Jul. 26, 2023, in International Patent Application No. PCT/KR2023/005953.
European Search Report dated Jul. 22, 2025, in European Application No. 23843137.3.

*Primary Examiner* — C. A. Rivera

(74) *Attorney, Agent, or Firm* — STAAS & HALSEY LLP

(57)      ABSTRACT

A docking station for a robotic vacuum cleaner may include a docking unit having a traveling path for the robotic vacuum cleaner to enter the docking station and travel to a mopping cloth attachment position where a mopping cloth is attachable to the vacuum cleaner. The docking station also includes a mopping cloth supply unit disposed above the docking unit and configured to receive a plurality of mopping cloths, and the plurality of mopping cloths are side by side along a horizontal direction. The mopping cloth supply unit may include a mopping cloth transporting unit that are configured so that the mopping cloth transporting unit sequentially transports each mopping cloth of the plurality of mopping cloths received by the mopping cloth supply unit (Continued)

along the horizontal direction to an outlet to be discharged through the outlet to the mopping cloth attachment position.

20 Claims, 16 Drawing Sheets

(51) Int. Cl.
*A47L 11/282* (2006.01)
*A47L 11/40* (2006.01)
*B65G 33/02* (2006.01)

(52) U.S. Cl.
CPC .......... *A47L 11/4091* (2013.01); *B65G 33/02* (2013.01); *A47L 2201/022* (2013.01); *A47L 2201/028* (2013.01)

(58) Field of Classification Search
CPC ............. A47L 2201/00; A47L 2201/02; A47L 2201/022; A47L 2201/024; A47L 2201/026; A47L 2201/028; B65G 33/00; B65G 33/02
See application file for complete search history.

(56) References Cited

U.S. PATENT DOCUMENTS

| | | | | |
|---|---|---|---|---|
| 2020/0139561 | A1 * | 5/2020 | Kim | ........................ A47L 13/51 |
| 2022/0142444 | A1 | 5/2022 | Xie et al. | |
| 2022/0409001 | A1 * | 12/2022 | Weis | ....................... A47L 11/10 |

FOREIGN PATENT DOCUMENTS

| | | | | | |
|---|---|---|---|---|---|
| CN | 113397438 | A | 9/2021 | | |
| CN | 114711688 | B | 11/2023 | | |
| DE | 10 2020 119 345 | A1 | 1/2022 | | |
| JP | 2014-508188 | | 4/2014 | | |
| JP | 2020-99666 | | 7/2020 | | |
| KR | 10-2020-0052071 | | 5/2020 | | |
| KR | 10-2103420 | | 5/2020 | | |
| KR | 10-2021-0105908 | | 8/2021 | | |
| KR | 10-2293283 | | 8/2021 | | |
| KR | 102293283 | B1 * | 8/2021 | ............. | G07F 11/42 |
| KR | 10-2022-0020360 | | 2/2022 | | |
| KR | 10-2022-0041488 | | 4/2022 | | |
| WO | WO-2022124782 | A1 * | 6/2022 | ........... | A47L 7/0095 |

* cited by examiner

ROBOTIC VACUUM CLEANER, DOCKING STATION, AND CLEANING SYSTEM INCLUDING THE SAME

CROSS-REFERENCE TO RELATED APPLICATIONS

This application is a continuation application of International Application No. PCT/KR2023/005953 designating the United States, filed on May 2, 2023, in the Korean Intellectual Property Receiving Office, which claims priority from Korean Patent Application No. 10-2022-0091122, filed on Jul. 22, 2022, in the Korean Intellectual Property Office, the disclosures of which are hereby incorporated by reference herein in their entireties.

BACKGROUND

1. Field

Embodiments of the disclosure relate to a robotic vacuum cleaner capable of attaching a mop, a docking station providing automatic replacement of a mop attached to the robotic vacuum cleaner, and a cleaning system including the same.

2. Description of Related Art

A robotic vacuum cleaner is a device that automatically cleans a cleaning space while moving in the cleaning space without the user's manipulation. In general, a robotic vacuum cleaner may suck up a foreign object, such as dust accumulated on the surface to be cleaned (e.g., the floor), or wiping off a foreign object, such as dirt stuck on the surface to be cleaned, with a mopping cloth. Among these robotic vacuum cleaners, a type of robotic vacuum cleaners wipe off the foreign object stuck on the surface by rotating a mopping cloth attached thereto.

As cleaning proceeds, the mopping cloth attached to the robotic vacuum cleaner may be contaminated. For effective cleaning, the user needs to replace the contaminated mopping cloth.

SUMMARY

There may be provided a docking station supporting replacement of a mopping cloth attached to a robotic vacuum cleaner to be used for cleaning and corresponding thereto a robotic vacuum cleaner.

According to an embodiment of the disclosure, the docking station may include a docking unit having a traveling path for a robotic vacuum cleaner to enter the docking station and travel to a mopping cloth attachment position at which a mopping cloth is attachable to the robot vacuum cleaner.

According to an embodiment, the docking station may include a mopping cloth supply unit disposed above the docking unit and configured to receive a plurality of mopping cloths, and the mopping cloths of the mopping cloths are side by side along a horizontal direction.

According to an embodiment, the mopping cloth supply unit may include a mopping cloth transporting unit that are configured so that
the mopping cloth transporting unit sequentially transports each mopping cloth of the plurality of mopping cloths received by the mopping cloth supply unit along the horizontal direction to an outlet to be discharged through the outlet to the mopping cloth attachment position.

According to an embodiment, the mopping cloth transporting unit may include a motor.

According to an embodiment, the mopping cloth transporting unit may include a screw rotatably drivable by the motor and having a spiral structure that extends along the horizontal direction.

According to an embodiment, the screw has a plurality of pitches and may be configured so that each mopping cloth of the plurality of mopping cloths is insertable into a respective pitch of the plurality of pitches.

According to an embodiment, the docking unit may include a mopping cloth guide unit on an upper surface of the docking unit and configured to guide each mopping cloth of the plurality of mopping cloths discharged through the outlet to be positioned in the mopping cloth attachment position.

According to an embodiment, the guide unit may include a guide rib protruding from the upper surface of the docking unit to guide each mopping cloth of the plurality of mopping cloths discharged through the outlet the mopping cloth attachment position.

According to an embodiment, the guide unit may include at least one roller on the upper surface of the docking unit to guide each mopping cloth of the plurality of mopping cloths discharged through the outlet moves to the mopping cloth attachment position.

According to an embodiment, the mopping cloth supply unit may include a supply unit cover pivotably coupled to an upper surface of the mopping cloth supply unit and pivotable to open or close at least a portion of the mopping cloth supply unit.

According to an embodiment, the mopping cloth supply unit may have a drawer that contains at least a portion of the mopping cloth transporting unit and may be drawn out from the mopping cloth supply unit.

According to an embodiment, the docking station may include a mopping cloth detection sensor configured to detect a number of the mopping cloths of the plurality of mopping cloths present in the mopping cloth supply unit.

According to an embodiment, the docking station may include an alarm providing unit configured to provide an alarm when the mopping cloth detection sensor detects that the number of mopping cloths of the plurality of mopping cloths present in the mopping cloth supply unit is a predetermined number or less.

According to an embodiment, the docking station may include a mopping cloth removing unit having at least one protrusion protruding from a an upper surface of the docking unit and configured, so that, when a mopping cloth is attached to the robotic vacuum cleaner while the robotic vacuum cleaner travels along the travel path, at least a portion of the at least one protrusion becomes inserted into a space between the robotic vacuum cleaner and the mopping cloth to remove the mopping cloth from the robotic vacuum cleaner.

According to an embodiment, the at least one protrusion may have a wedge shape forming a predetermined acute angle from the upper surface of the docking unit.

According to an embodiment, the docking unit may include an opening at least a portion of which is positioned under the at least one protrusion so that, the removed mopping cloth is inserted through the opening into the docking unit.

According to an embodiment, the at least one protrusion may have a first protrusion and a second protrusion each protruding from the upper surface of the docking unit and spaced apart from each other by a predetermined interval.

According to an embodiment, the docking station may include a mopping cloth recovery unit within the docking unit and configured to receive the mopping cloth inserted through the opening.

According to an embodiment of the disclosure, a cleaning system may include a robotic vacuum cleaner and a docking station. The docking station may include a docking unit having a traveling path for a robotic vacuum cleaner to enter the docking station and travel to a mopping cloth attachment position at which a mopping cloth is attachable to the robot vacuum cleaner.

According to an embodiment, the docking station may include a mopping cloth supply unit disposed above the docking unit and configured to receive a plurality of mopping cloths, the mopping cloths are side by side along a horizontal direction.

According to an embodiment, the mopping cloth supply unit may include a mopping cloth transporting unit that are configured so that the mopping cloth transporting unit sequentially transports each mopping cloth of the plurality of mopping cloths received by the mopping cloth supply unit along the horizontal direction to an outlet to be discharged through the outlet to the mopping cloth attachment position.

According to an embodiment, the robotic vacuum cleaner is configured to, when the robotic vacuum cleaner is at the mopping cloth attachment position with a mopping cloth that was discharged through the outlet being at the mopping cloth attachment position, attach the mopping cloth to the robotic vacuum cleaner According to an embodiment, the mopping cloth supply unit may include a motor.

According to an embodiment, the mopping cloth supply unit may include a screw rotatably drivable by the motor and having a spiral structure formed that extends along the horizontal direction to sequentially transport each mopping cloth of the plurality of mopping cloths received in the mopping cloth supply unit along the horizontal direction.

According to an embodiment, the docking station may include a guide rib protruding from the upper surface of the docking unit and at least one roller in the upper surface of the docking unit, the at least one guide rib and the at least one roller configured to guide each mopping cloth of the plurality of mopping cloths discharged from the mopping cloth supply unit to the mopping cloth attachment position.

According to an embodiment, the docking station may have a protrusion protruding from an upper surface of the docking unit and configured so that, when a mopping cloth is attached to the robotic vacuum cleaner while the robotic vacuum cleaner travels along the travel path, at least a portion of the protrusion becomes inserted into a space between the robotic vacuum cleaner and the mopping cloth to remove the mopping cloth from the robotic vacuum cleaner while the robotic vacuum cleaner before the robotic vacuum cleaner reaches the mopping cloth attachment position.

According to an embodiment, the robotic vacuum cleaner may include a first charging terminal unit.

According to an embodiment, the docking station may include a second charging terminal unit, so that, when the robotic vacuum cleaner is positioned at the mopping cloth attachment position, the first charging terminal unit contacts the second charging terminal unit to charge the robotic vacuum cleaner.

According to an embodiment, the robotic vacuum cleaner includes a mopping cloth unit to which a mopping cloth is attachable. The mopping cloth unit may be configured to, when the robotic vacuum cleaner reaches the mopping cloth attachment position with no mopping cloth attached to the mopping cloth unit, descend to contact the mopping cloth at the mopping cloth attachment position, so that the mopping cloth attaches to the mopping cloth unit.

According to an embodiment of the disclosure, as the mopping cloth attached to the robotic vacuum cleaner is automatically replaced by the docking station rather than directly by the user, user convenience may be enhanced.

The technical objects of the disclosure are not limited to the foregoing, and other technical objects may be derived by one of ordinary skill in the art from example embodiments of the disclosure.

Effects of the present invention are not limited to the foregoing, and other unmentioned effects would be apparent to one of ordinary skill in the art from the following description. In other words, unintended effects in practicing embodiments of the disclosure may also be derived by one of ordinary skill in the art from the embodiments of the disclosure.

DETAILED DESCRIPTION

Figure 1:
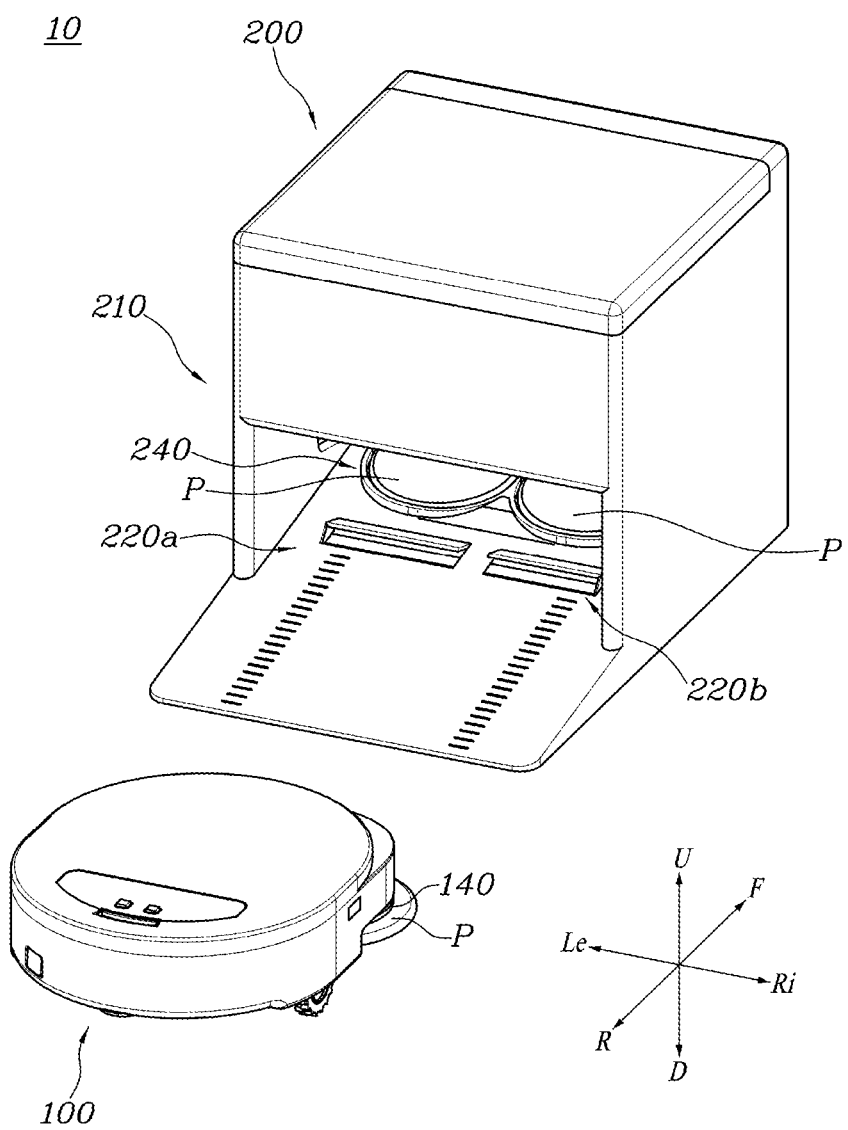
FIG. 1 is a view schematically illustrating a cleaning system according to an embodiment.

Embodiments of the present invention are now described with reference to the accompanying drawings in such a detailed manner as to be easily practiced by one of ordinary skill in the art. However, the present invention may be implemented in other various forms and is not limited to the embodiments set forth herein. The same or similar reference denotations may be used to refer to the same or similar elements throughout the specification and the drawings. Further, for clarity and brevity, no description is made of well-known functions and configurations in the drawings and relevant descriptions.

FIG. 1 is a view schematically illustrating a cleaning system according to an embodiment.

Referring to FIG. 1, a cleaning system 10 according to an embodiment may include a robotic vacuum cleaner 100 and a docking station 200.

In an embodiment, the robotic vacuum cleaner 100 may be in a state in which a mopping cloth P (wet mopping cloth or dry mopping cloth) contactable to the surface to be cleaned (e.g., floor) is attached to mopping cloth units 140 at the underside of the robotic vacuum cleaner 100. The robotic vacuum cleaner 100 may perform the operation (or mopping) of removing the foreign object stuck to the surface to be cleaned, by the mopping cloth P attached to the mopping cloth units 140 at the underside of the robotic vacuum cleaner 100. For example, the robotic vacuum cleaner 100 may remove the foreign object stuck to the floor by the frictional force between the floor and the mopping cloth P, created as the mopping cloth P attached underneath is rotated.

The robotic vacuum cleaner 100 may enter the docking station 200 to replace the mopping cloth P attached to the mopping cloth units 140. The robotic vacuum cleaner 100 may enter the docking station 200 to charge a battery (e.g., the battery 150 of FIG. 3). The specific configuration and operation of the robotic vacuum cleaner 100 are described below with reference to FIGS. 2 to 4.

In an embodiment, the docking station 200 may include a station housing 210 that forms the overall appearance of the docking station 200. In an embodiment, the docking station 200 may include mopping cloth removing units 220a and 220b that supports to remove of the mopping cloth P attached to the mopping cloth units 140 of the robotic vacuum cleaner 100 without a human intervention. In an embodiment, the docking station 200 may provide mopping cloth attachment positions PP1 and PP2 where a new mopping cloth P is attached to the mopping cloth units 140 of the robotic vacuum cleaner 100. In an embodiment, the docking station 200 may include a mopping cloth guide unit 240 that guides the mopping cloth received inside to the mopping cloth attachment positions PP1 and PP2. In an embodiment, the mopping cloth removing units 220a and 220b and the mopping cloth attachment positions PP1 and PP2 may be disposed on the traveling path of the robotic vacuum cleaner 100 formed on the docking unit 212. Although not shown in the drawings, the docking station 200 may be configured to include a pair of charging terminals 2111a and 2111b for charging the battery 150 disposed in the robotic vacuum cleaner 100.

The specific configuration and operation of the docking station 200 are described below with reference to FIGS. 5 to 10.

Figure 2:
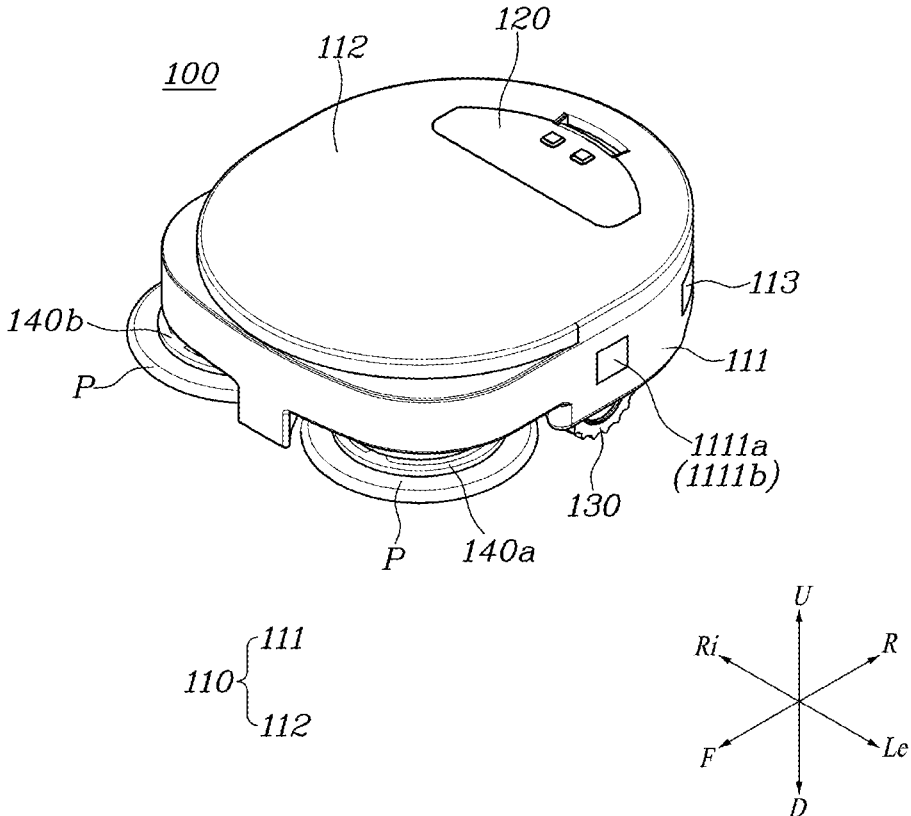
FIG. 2 is a perspective view illustrating a robotic vacuum cleaner according to an embodiment.
Figure 3:
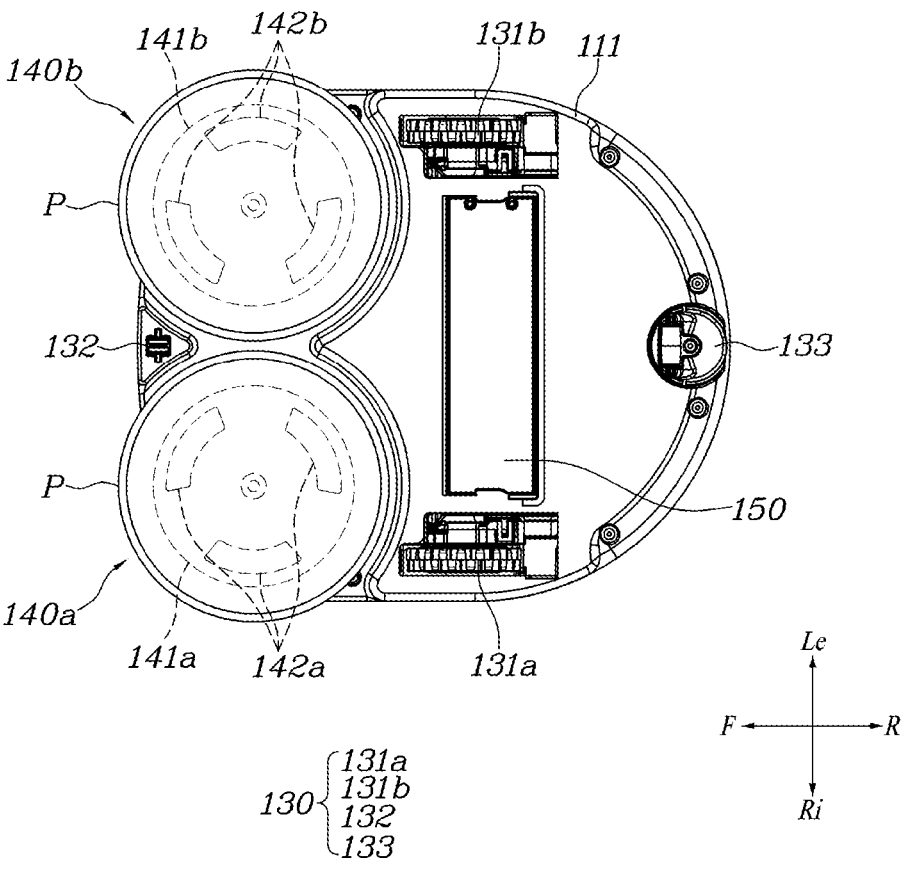
FIG. 3 is a bottom view illustrating a robotic vacuum cleaner according to an embodiment.

FIG. 2 is a perspective view illustrating a robotic vacuum cleaner according to an embodiment. FIG. 3 is a bottom view illustrating a robotic vacuum cleaner according to an embodiment.

Referring to FIGS. 2 and 3, in an embodiment, the robotic vacuum cleaner housing 110 may include a cleaner body 111 and a cleaner cover 112. In an embodiment, the cleaner body 111 may form the lower and/or side appearance of the robotic vacuum cleaner 100. According to an embodiment, a power button 113 may be disposed on one side of the cleaner body 111. According to an embodiment, the power button 113 may be manipulated for on/off by the user to power on/off the robotic vacuum cleaner 100. The cleaner cover 112 may form the upper appearance of the robotic vacuum cleaner 100. The cleaner cover 112 may be coupled to an upper side of the cleaner body 111.

In an embodiment, the robotic vacuum cleaner 100 may include a control panel 120 disposed on an upper surface of the cleaner cover 112. The control panel 120 may receive various commands regarding the operation of the robotic vacuum cleaner 100 from the user. According to an embodiment, the control panel 120 may provide the current status regarding the operation of the robotic vacuum cleaner 100 to the user.

According to an embodiment, the control panel 120 may include an input device, such as a button, a switch, or a touch panel. According to an embodiment, the robotic vacuum cleaner 100 may receive commands (e.g., start/stop cleaning or switch cleaning modes) regarding the operation of the robotic vacuum cleaner 100 from the user through the input device of the control panel 120. According to an embodiment, the control panel 120 may include a display device such as a display. According to an embodiment, the robotic vacuum cleaner 100 may display, to the user, information (e.g., current cleaning mode or battery status) regarding the current status of the robotic vacuum cleaner 100 through the display device of the control panel 120. According to an embodiment, the control panel 120 may have an input device and a display device integrated together, but the disclosure is not limited thereto.

Referring to FIG. 3, in an embodiment, a driving unit 130 may be disposed on the bottom surface of the cleaner body 111. The robotic vacuum cleaner 100 may move in the cleaning space through the driving unit 130. The driving unit 130 may be configured to allow the robotic vacuum cleaner 100 to freely move. The driving unit 130 may include one or more wheels that rotate by receiving power from a driving unit (not shown) provided inside the robotic vacuum cleaner 100. According to an embodiment, the driving unit 130 may include a pair of main wheels (i.e., a first main wheel 131a and a second main wheel 131b). In an embodiment, the first main wheel 131a and the second main wheel 131b may be disposed to support while balancing the body of the robotic vacuum cleaner 100 at two opposite edges of the bottom surface of the cleaner body 111. The driving unit 130 may include a first sub wheel 132 and a second sub wheel 133. In an embodiment, the first sub wheel 132 and the second sub wheel 133, respectively, may be disposed at the front and rear in a direction perpendicular to the direction in which the first main wheel 131a and the second main wheel 131b are disposed.

In an embodiment, the traveling direction of the robotic vacuum cleaner 100 may be determined depending on how the movement of each of the first main wheel 131a and second main wheel 131b is controlled. For example, when the first and second main wheels 131a and 131b are controlled to rotate at the same speed in the same direction, the robotic vacuum cleaner 100 may move forward or rearward. For example, when the pair of main wheels 131a and 131b are controlled to rotate in different directions and/or at different speeds, the robotic vacuum cleaner 100 may change the moving direction and move as determined.

In an embodiment, the first sub wheel 132 may be disposed forward (e.g., F direction) of the bottom surface of the cleaner body 111. In an embodiment, the second sub wheel 133 may be disposed rearward (e.g., R direction) of the bottom surface of the cleaner body 111. In an embodiment, the first sub wheel 132 and the second sub wheel 133 may support the robotic vacuum cleaner 100 to balance the robotic vacuum cleaner 100 when moving forward or rearward.

In an embodiment, the mopping cloth units 140 may be disposed on the bottom surface of the cleaner body 111. In an embodiment, the mopping cloth units 140 may be disposed forward of the bottom surface of the cleaner body 111, but the disclosure is not limited thereto. A mopping cloth P (wet mopping cloth or dry mopping cloth) may be detachably coupled to the mopping cloth units 140 to wipe off the floor. The mopping cloth units 140, together with the mopping cloth P attached to the mopping cloth units 140, may rotate clockwise or counterclockwise. When the mopping cloth units 140 are rotated along with the mopping cloth P attached thereto, friction may occur between the mopping cloth P and the floor. Thus, the robotic vacuum cleaner 100 may remove the foreign object stuck to the floor. In an embodiment, the mopping cloth units 140 may ascend or descend within a predetermined distance range in the height direction of the robotic vacuum cleaner 100 (e.g., direction perpendicular to the cleaning surface when the robotic vacuum cleaner 100 is placed on the cleaning surface).

In an embodiment, the mopping cloth units 140 may include a first mopping cloth unit 140a and a second mopping cloth unit 140b. The first mopping cloth unit 140a and the second mopping cloth unit 140b may correspond to each other in operation, structure, and shape. In an embodiment, the mopping cloth units 140 (e.g., the first mopping cloth unit 140a and the second mopping cloth unit 140b) may include a rotating plate (e.g., a first rotating plate 141a or a second rotating plate 141b) and an attaching member (e.g., a first attaching member 142a or a second attaching member 142b). In FIG. 2, the rotating plates 141a and 141b and the attaching members 142a and 142b are hidden by the mopping cloth P attached to the mopping cloth units 140 and, to represent the state, the rotating plates 141a and 141b and the attaching members 142a and 142b are shown in dashed lines.

In an embodiment, the first and second rotating plates 141a and 141b may overall have a disc shape. However, embodiments of the disclosure are not limited thereto. According to an embodiment, the diameter of the first rotating plate 141a may be set to be equal to or smaller than the diameter of the mopping cloth P, but is not limited thereto. Likewise, the diameter of the second rotating plate 141b may be set to be equal to or smaller than the diameter of the mopping cloth P, but is not limited thereto.

Each corresponding attaching member, e.g., the first attaching member 142a or the second attaching member 142b, may be disposed on one surface of each of the first rotating plate 141a and the second rotating plate 141b. In an embodiment, the mopping cloth P may be attached to each corresponding rotating plate 141a or 141b by the first or second attaching member 142a or 142b. The first or second attaching member 142a or 142b may be, e.g., a Velcro-type attaching means, but the disclosure is not limited thereto. According to an embodiment, the first or second attaching member 142a or 142b may be divided into a plurality of segments, but the disclosure is not limited thereto. In an embodiment, the first or second attaching member 142a or 142b may be constituted of a plurality of segments spaced apart from each other by a predetermined interval along the circumferential direction at the edge of the rotating plate 141a or 141b.

In an embodiment, the battery 150 may be disposed at the underside of the robotic vacuum cleaner 100. In an embodiment, the battery 150 may be provided to be detachable through the underside at the bottom surface of the cleaner body 111, but the disclosure is not limited thereto. The battery 150 may be electrically connected with a driving unit (not shown), such as a motor, for transferring power to the driving unit 130 and/or the mopping cloth units 140 and supply power. The battery 150 may be a rechargeable secondary battery, but is not limited thereto. According to an embodiment, when charging terminals, e.g., a first charging terminal 1111a and/or a second charging terminal 1111b, provided on two opposite side surfaces of the robotic vacuum cleaner 100 contact charging terminals, e.g., a first charging terminal (e.g., the first charging terminal 2111a of FIG. 6 and/or a second charging terminal (e.g., the second charging terminal 2111b of FIG. 6), provided in the main body unit 211 of the docking station 200 described below, the battery 150 may receive power from the docking station 200 and be charged. In the drawings and the description, although the battery 150 is described and illustrated as being charged through contact charging, the disclosure is not limited thereto. According to an embodiment, the battery 150 may be charged by wireless charging, such as magnetic induction. In this case, a wireless charging structure (not shown) for wireless charging may be provided in each of the robotic vacuum cleaner 100 and the docking station 200.

Although not shown in FIGS. 2 and 3, a driving unit may be provided in the robotic vacuum cleaner 100. In an embodiment, although not specifically illustrated, the driving unit may include a plurality of components, including a motor and/or an actuator, to supply power to the above-described traveling unit 130 or mopping cloth unit 140. In an embodiment, the driving unit may be connected to the above-described traveling unit 130, e.g., each of the first and second main wheels 131a and 131b, to provide power necessary to move the robotic vacuum cleaner 100. In an embodiment, the driving unit may be connected to the mopping cloth unit 140 to provide power necessary to rotate each rotating plate 141a or 141b. In an embodiment, the driving unit may be connected to the mopping cloth unit 140 to provide power to ascend and/or descend in the height (or vertical) direction of the mopping cloth unit 140.

Although not shown in FIGS. 2 and 3, the robotic vacuum cleaner 100 may include a controller (e.g., the controller 170 of FIG. 4) to generate control commands for controlling the operation of each unit of the robotic vacuum cleaner 100. The control function by the controller according to an embodiment is briefly described with reference to FIG. 4.

Figure 4:
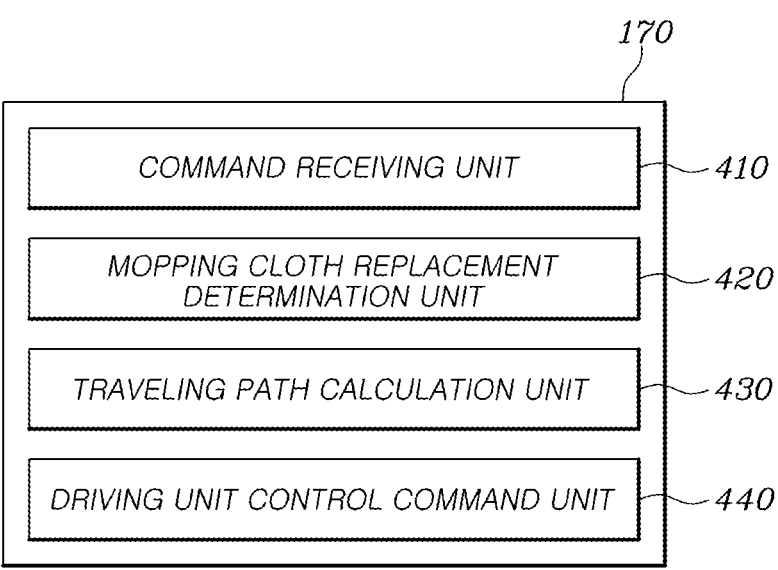
FIG. 4 is a view schematically illustrating functional blocks constituting a controller of a robotic vacuum cleaner according to an embodiment.

FIG. 4 is a view schematically illustrating functional blocks constituting a controller of a robotic vacuum cleaner according to an embodiment.

According to an embodiment, the controller 170 may include a command receiving unit 410. The command receiving unit 410 may receive commands from the user. The command receiving unit 410 may receive the command from the user, received through the above-described power button 113 and/or the control panel 120. The command receiving unit 410 may receive each user command including operation on/off command, cleaning start or pause command, or cleaning mode setting command.

In an embodiment, the controller 170 may include a mopping cloth replacement determination unit 420 to determine whether to replace the mopping cloth attached to the mopping cloth unit 140 while cleaning. In an embodiment, the mopping cloth replacement determination unit 420 may determine whether to mopping cloth replacement is required depending on a result of detection by a separate contamination sensor (not shown) provided. In an embodiment, the mopping cloth replacement determination unit 420 may determine whether mopping cloth replacement is required according to the elapse of cleaning time after the mopping cloth is attached to the mopping cloth unit 140. In an embodiment, the mopping cloth replacement determination unit 420 may determine whether mopping cloth replacement is required according to the command received from the command receiving unit 410. In an embodiment, the mopping cloth replacement determination unit 420 may determine whether mopping cloth replacement is required according to a predetermined reference set by the user.

In an embodiment, the controller 170 may include a traveling path calculation unit 430 to calculate the traveling path of the robotic vacuum cleaner 100. In an embodiment, the traveling path calculation unit 430 may calculate the traveling path of the robotic vacuum cleaner 100 based on the user command received through the command receiving unit 410 and/or a predetermined algorithm. In an embodiment, the traveling path calculation unit 430 may calculate the traveling path considering the result of detection from the sensor (not shown) provided in the robotic vacuum cleaner 100. In an embodiment, when the mopping cloth replacement determination unit 420 determines that the mopping cloth needs to be replaced, the traveling path calculation unit 430 may calculate the traveling path to allow the robotic vacuum cleaner 100 to travel to the docking station 200. In an embodiment, when the battery 150 is determined to be charged, the traveling path calculation unit 430 may calculate the traveling path to allow the robotic vacuum cleaner 100 to travel to the docking station 200.

In an embodiment, the controller 170 may include a driving unit control command unit 440. In an embodiment, the driving unit control command unit 440 may generate control commands to control each component, e.g., motor and/or actuator, of the driving unit to allow the robotic vacuum cleaner 100 to move along the traveling path determined by the traveling path calculation unit 430 and the command received from the user through the above-described command receiving unit 410. In an embodiment, each component of the driving unit may be operated according to the command generated by the driving unit control command unit 440. In an embodiment, each component of the driving unit may be operated to properly control the rotating direction and speed of the first and second main wheels 131a and 131b according to the command generated by the driving unit control command unit 440, thereby allowing the robotic vacuum cleaner 100 to properly move in a required direction.

In an embodiment, the driving unit control command unit 440 may generate the control command for controlling each component, e.g., motor and/or actuator, of the driving unit to allow the mopping cloth unit 140 to move based on the command received from the user through the above-described command receiving unit 410. In an embodiment, each component of the driving unit may be operated to properly adjust the rotating speed of each rotating plate 141a or 141b according to the command generated by the driving unit control command unit 440. In this case, the mopping strength of the robotic vacuum cleaner 100 may be adjusted. In an embodiment, each component of the driving unit may adjust the mopping cloth unit 140 to ascend or descend in the height direction according to the command generated by the driving unit control command unit 440. In this case, the distance between the mopping cloth unit 140 and the floor may be adjusted.

Figure 5:
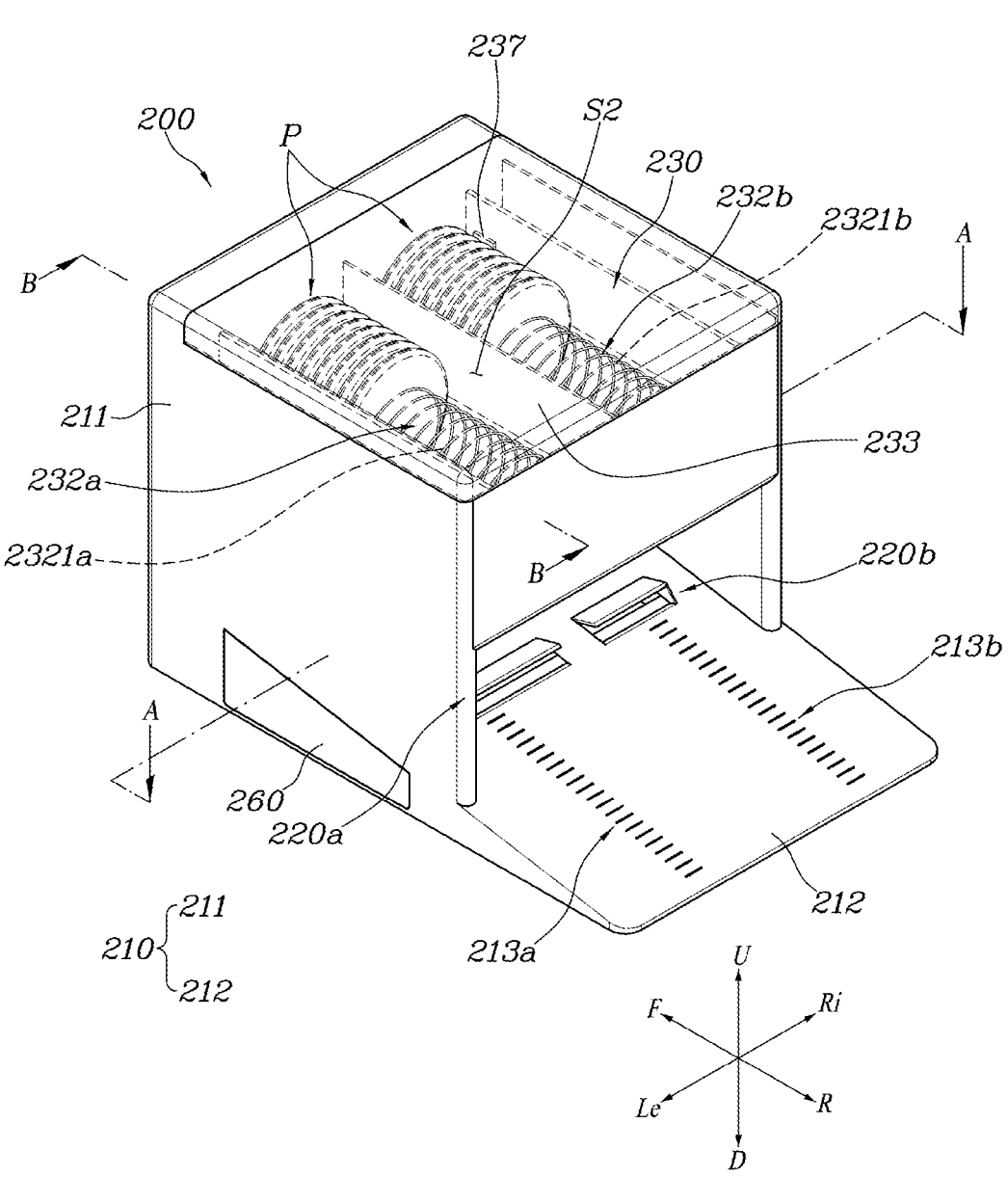
FIG. 5 is a perspective view illustrating a docking station according to an embodiment.
Figure 6:
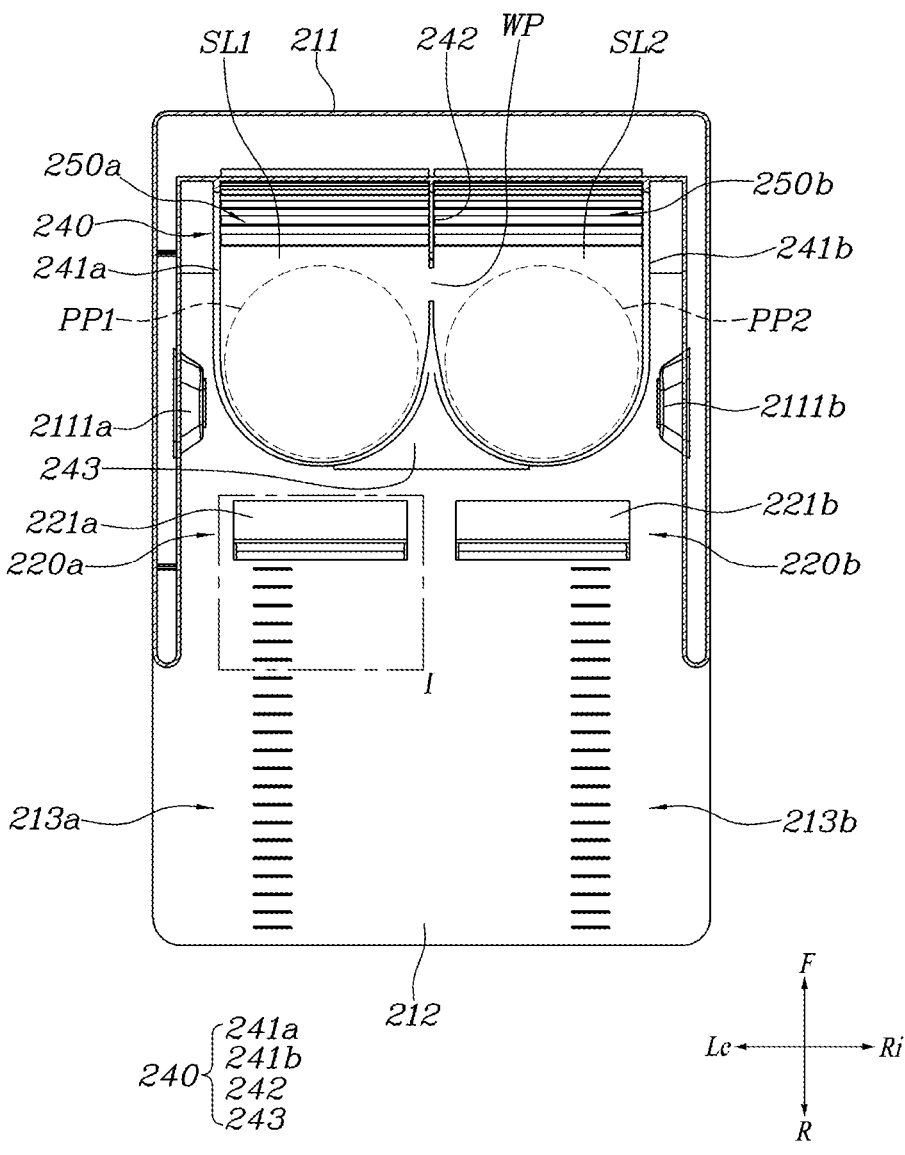
FIG. 6 is a cross-sectional view of a docking station taken along line A-A of FIG. 5 according to an embodiment.
Figure 7:
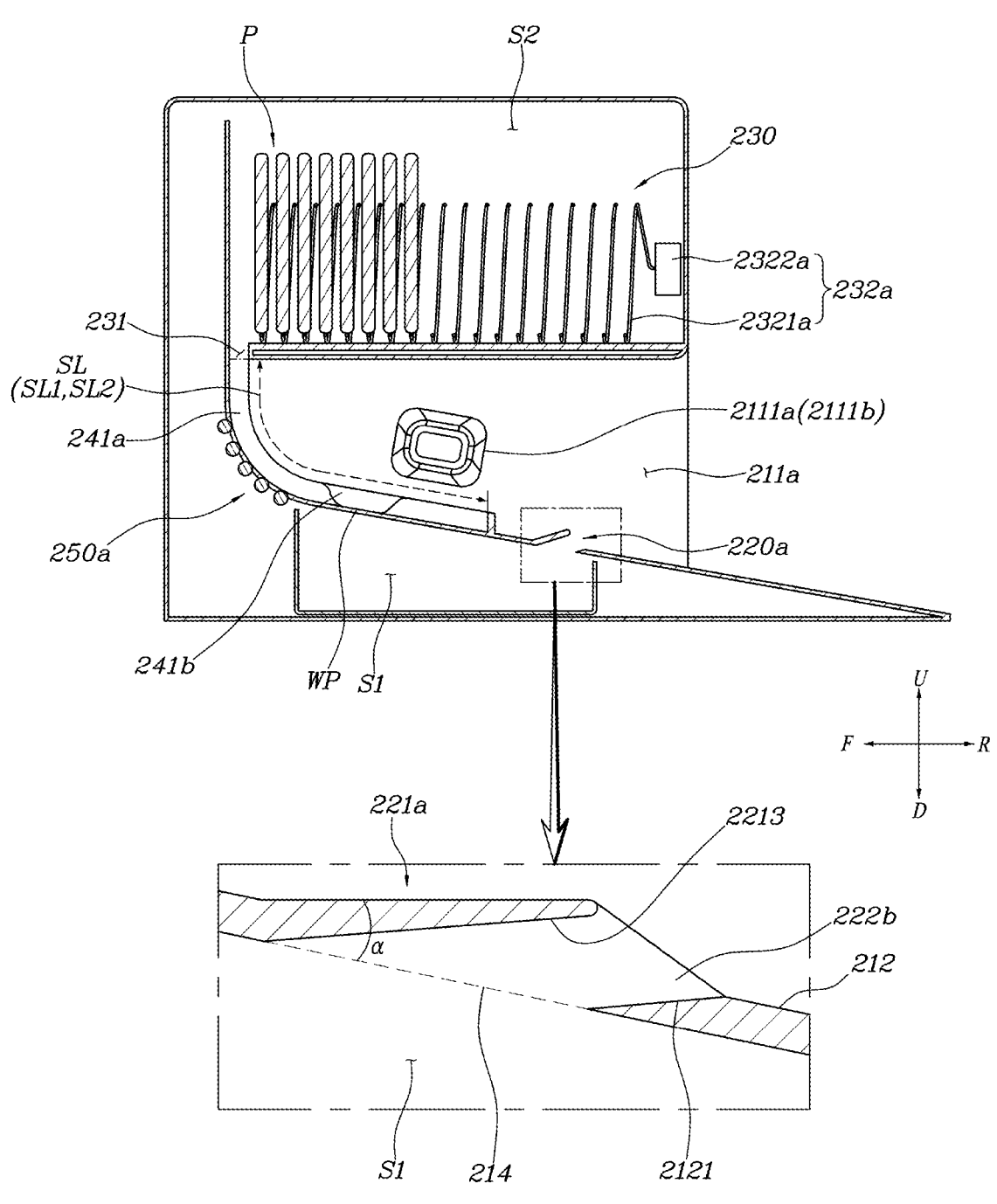
FIG. 7 is a cross-sectional view of a docking station taken along line B-B of FIG. 5 according to an embodiment.
Figure 8:
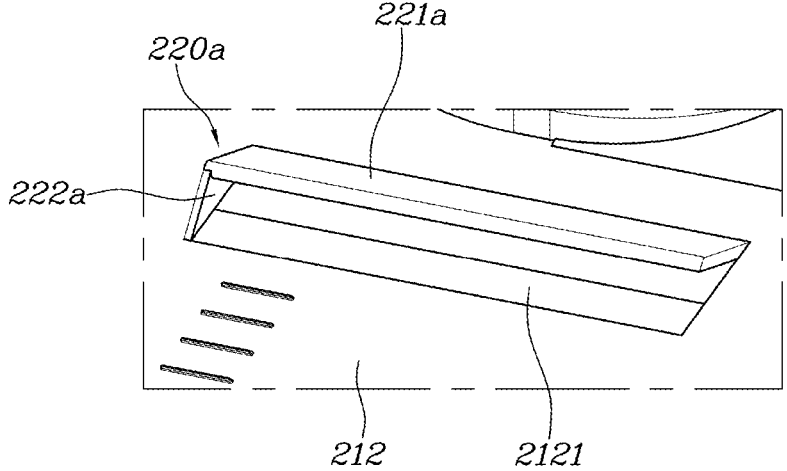
FIG. 8 is an enlarged view of portion I of FIG. 6, as viewed from the top and front.

FIG. 5 is a perspective view illustrating a docking station according to an embodiment. FIG. 6 is a cross-sectional view of a docking station taken along line A-A of FIG. 5 according to an embodiment. FIG. 7 is a cross-sectional view of a docking station taken along line B-B of FIG. 5 according to an embodiment. FIG. 8 is an enlarged view of portion I of FIG. 6, as viewed from the top and front.

Referring to FIGS. 5 to 8, in an embodiment, the docking station 200 may include a station housing 210, mopping cloth removing units 220a and 220b, a mopping cloth supply unit 230, and a mopping cloth guide unit 240.

According to an embodiment, the station housing 210 may form the overall appearance of the docking station 200. According to an embodiment, the station housing 210 may include a main body unit 211 and a docking unit 212.

According to an embodiment, the docking unit 212 may provide a traveling path for the cleaner 100 approaching the docking station 200. According to an embodiment, a traveling trajectory for the robotic vacuum cleaner 100 entering the docking station 200 to charge the battery 150 or replace the mopping cloth P, e.g., a traveling surface where the pair of main wheels 131 provided in the robotic vacuum cleaner 100 pass, may be formed on the upper surface of the docking unit 212. According to an embodiment, a traveling trajectory for the robotic vacuum cleaner 100 exiting the docking station 200 after the charging of the battery 150 and/or replacement of the mopping cloth P is completed, i.e., the traveling surface where the pair of main wheels 131 provided in the robotic vacuum cleaner 100 pass, may be formed on the upper surface of the docking unit 212.

According to an embodiment, the docking unit 212 may include an inclined road. In an embodiment, the docking unit 212 may form an inclined surface that gradually ascends along the direction (e.g., F direction) in which the robotic vacuum cleaner 100 enters the docking station 200.

According to an embodiment, the docking unit 212 may have anti-slip members 213a and 213b. In an embodiment, the anti-slip members 213a and 213b may be disposed at the edges of left and right side ends of the docking unit 212. In an embodiment, the anti-slip member 213a or 213b may be disposed in the position corresponding to the traveling trajectory of the robotic vacuum cleaner 100. According to an embodiment, there may be provided a plurality of anti-slip members 213a and 213b. In an embodiment, the anti-slip members 213a and 213b may be disposed to be spaced apart from each other by a predetermined interval along the direction in which the inclination of the docking unit 212 proceeds (or the traveling direction (e.g., F or R direction) of the robotic vacuum cleaner 100). According to an embodiment, the anti-slip members 213a and 213b may be configured to prevent a slip of the robotic vacuum cleaner 100 moving along the docking unit 212. The anti-slip members 213a and 213b may be formed of, e.g., rubber.

In an embodiment, the first mopping cloth removing unit 220a and the second mopping cloth removing unit 220b may be disposed on the upper surface of the docking unit 212 to be spaced apart from each other by a predetermined interval. According to an embodiment, the first and second mopping cloth removing units 220a and 220b, respectively, may include a first protrusion 221a and a second protrusion 221b protruding from the surface of the docking unit 212. The first protrusion 221a or the second protrusion 221b may extend in a predetermined length (e.g., which may correspond to the diameter of the mopping cloth P attached to the robotic vacuum cleaner 100) along a direction (e.g., Le direction or Ri direction perpendicular to F or R direction) different from the traveling direction (e.g., F or R direction) of the robotic vacuum cleaner 100. The respective extending directions and/or lengths of the first and second protrusions 221*a* and 221*b* may be the same or different from each other. In an embodiment, the first and second protrusions 221*a* and 221*b* may protrude at a predetermined acute angle from the upper surface of the docking unit 212, forming a wedge shape. In an embodiment, the angle (e.g., angle α of FIG. 7) between the upper surface of the docking unit 212 and the protrusion 221 may belong to a range of about 30 degrees or less. The angles between the upper surface of the docking unit 212 and the first and second protrusions 221*a* and 221*b* may be the same or different from each other. In the disclosure, the description focuses on an example in which the mopping cloth removing units for automatically removing the mopping cloth from the robotic vacuum cleaner 100 are constituted of the first and second mopping cloth removing units 220*a* and 220*b* separate from each other, but the disclosure is not limited thereto. In an embodiment, the robotic vacuum cleaner 100 may include one elongated mopping cloth removing unit. In an embodiment, the robotic vacuum cleaner 100 may include three or more separated mopping cloth removing units.

In an embodiment, as shown in FIG. 8, the first mopping cloth removing unit 220*a* may include a first side portion 222*a* connecting one side end of the corresponding first protrusion 221*a*, e.g., one side end adjacent to the widthwise edge of the docking unit 212, with the upper surface of the docking unit 212. In an embodiment, the second mopping cloth removing unit 220*b* may include a second side portion 222*b* connecting one side end of the second protrusion 221*b* (the opposite end far from the first side portion 222*a*) adjacent to the widthwise edge of the docking unit 212, with the upper surface of the docking unit 212. As the side portions 222*a* and 222*b* are disposed on two opposite side ends of the protrusions 221*a* and 221*b*, the mopping cloth removed from the robotic vacuum cleaner 100 may be supported to be safely inserted through an opening 214 without falling outside, as described below.

According to an embodiment, an opening 214 which is open upward may be formed in the position corresponding to each of the first and second protrusions 221*a* and 221*b*. According to an embodiment, a corresponding opening 214 may be formed downward of each of the first and second protrusions 221*a* and 221*b*. In an embodiment, the opening may extend in the same direction as each corresponding first or second protrusion 221*a* or 221*b*, but disclosure is not limited thereto.

According to an embodiment, each of the first and second protrusions 221*a* and 221*b* may be configured to cover at least a portion of the opening 214 in each corresponding position, from thereabove. In an embodiment, at least a portion of the corresponding opening 214 may be disposed in the space formed by the first protrusion 221*a* and the first side portion 222*a*. In an embodiment, at least a portion of the corresponding opening 214 may be disposed in the space formed by the second protrusion 221*b* and the second side portion 222*b*. As is described below, at least a portion of the mopping cloth P removed from the robotic vacuum cleaner 100 by the first and/or second protrusion 221*a* or 221*b* may be inserted through each opening 214.

In an embodiment, the docking unit 212 may include a recovery space S1 for receiving the mopping cloth P removed from the robotic vacuum cleaner 100, in the inside under the upper surface providing the traveling surface for the robotic vacuum cleaner 100. In an embodiment, the opening 214 may communicate with the recovery space S1. As is described below, the mopping cloth P removed from the robotic vacuum cleaner 100 by the first and/or second protrusion 221*a* or 221*b* may be received into the recovery space S1 through each opening 214.

According to an embodiment, as shown in the enlarged portion of FIG. 7, the area adjacent to the free end portion of the first protrusion 221*a* and its underneath opening 214, e.g., the inside end portion 2121 of the docking unit 212, may be formed to be inclined downward while facing the bottom surface 2213 of the first protrusion 221*a* toward the opening 214, along the direction (e.g., F direction) of entering the docking station 200 on the upper surface of the docking unit 212. According to an embodiment, the inside end portion 2121 of the docking unit 212 may be configured to have a surface parallel to the bottom surface 2213 of the first protrusion 221*a*. Although FIG. 7 illustrates only the opening 214 and the inside end portion 2121 facing the first protrusion 221*a*, according to an embodiment, the opening 214 and inside end portion 2121 corresponding to the second protrusion 221*b* may also be configured in the same or similar shape. When the inside end portion 2121 of the docking unit 212 is formed to be inclined toward the opening while facing the bottom surface 2213 of each of the first protrusion 221*a* or the second protrusion 221*b*, the mopping cloth P removed from the robotic vacuum cleaner 100 by the first protrusion 221*a* or the second protrusion 221*b* may be put in the opening 214 safely without falling outside.

According to an embodiment, as can be seen in FIG. 7, each mopping cloth P of the plurality of mopping cloths received in mopping cloth supply unit 230 may be at a predetermined angle to a surface on which the docking station 200 is positioned so as not to be parallel to the surface.

According to an embodiment, the main body unit 211 may form the upper and side appearance of the docking station 200. According to an embodiment, the main body unit 211 may include a mopping cloth receiving space S2 disposed above the docking unit 212, as described below. According to an embodiment, the docking unit 212 may form an upper portion of the docking station 200 by the mopping cloth receiving space S2. In an embodiment, the main body unit 211 may include three side walls surrounding the docking unit 212 along the direction parallel to the ground while leaving an inlet 211*a* for the robotic vacuum cleaner 100 to enter the docking station 200 through the docking unit 212. According to an embodiment, the main body unit 211 and the docking unit 212 may be integrally formed. According to an embodiment, the robotic vacuum cleaner 100 may travel on the docking unit 212 and enter the docking station 200 through the inlet 211*a* defined by the three side walls of the main body unit 211.

According to an embodiment, charging terminals 2111*a* and 2111*b* configured to contact the charging terminals 1111*a* and 1111*b* of the robotic vacuum cleaner 100 may be provided on the inner surface of the main body unit 211. In an embodiment, the charging terminals 2111*a* and 2111*b* may be disposed on the inner surfaces (e.g., the inner surfaces of two opposite side walls among the three side walls) of the main body unit 211, facing two opposite sides of the robotic vacuum cleaner 100 in a state in which the first sub wheel 132 is seated in the cleaner seating position WP. In the disclosure, the description focuses on an example in which the charging terminals 1111*a* and 1111*b* of the robotic vacuum cleaner 100 are disposed on the two opposite sides, respectively, of the robotic vacuum cleaner 100, and the charging terminals 2111a and 2111b of the docking station 200 are disposed corresponding to the two opposite directions perpendicular to the entering direction (e.g., F direction) of the robotic vacuum cleaner 100, but the disclosure is not limited thereto. The respective corresponding charging terminals of the robotic vacuum cleaner 100 and the docking station 200 may be disposed in various positions.

According to an embodiment, the mopping cloth supply unit 230 may be disposed in the mopping cloth receiving space S2 of the main body unit 211. According to an embodiment, the mopping cloth receiving space S2 and the mopping cloth supply unit 230 may be disposed above the docking unit 212. According to an embodiment, an unused or washed mopping cloth P may be received in the mopping cloth supply unit 230. According to an embodiment, a plurality of mopping cloths P received in the mopping cloth supply unit 230 may be raised at a predetermined angle (e.g., nearly 90 degrees as shown) between their respective cleaning surfaces and the bottom surface (or ground) and received side by side. According to an embodiment, as shown, the mopping cloths received in the mopping cloth supply unit 230 may be arranged in two rows, but the disclosure is not limited thereto. According to an embodiment, an outlet 231 which is open downward may be formed at one end portion in the horizontal direction of the mopping cloth supply unit 230. According to an embodiment, the plurality of mopping cloths P received in the mopping cloth supply unit 230 may be discharged downward through the outlet 231 one by one. Although not specifically shown, when the mopping cloths received in the mopping cloth supply unit 230 are arranged in two rows, an outlet 231 may be formed for each row, or a single long outlet may be configured for the rows. According to an embodiment, each mopping cloth P discharged through the outlet 231 may be supplied to each mopping cloth attachment position PP1 or PP2 along the mopping cloth guide unit 240.

According to an embodiment, the mopping cloth supply unit 230 may include a mopping cloth transporting unit 232. According to an embodiment, the mopping cloth transporting unit 232 may be configured to move back and/or forth the mopping cloth P received in the receiving space S2 along the horizontal direction. According to an embodiment, each mopping cloth P received in the mopping cloth supply unit 230 may be inserted/interposed in each predetermined position of the mopping cloth transporting unit 232. In an embodiment, each mopping cloth P received in the mopping cloth supply unit 230 may move closer to or away from the outlet 231 as the mopping cloth transporting unit 232 is rotated.

According to an embodiment, the mopping cloth transporting unit 232 may be configured to have a screw conveyor structure. According to an embodiment, the mopping cloth transporting unit 232 may include screws 2321a and 2321b and a motor 2322. According to an embodiment, the screws 2321a and 2321b may be configured to have a spiral structure extending along the horizontal direction. According to an embodiment, the screws 2321a and 2321b may be axially coupled to the motor 2322. According to an embodiment, the screws 2321a and 2321b may receive rotational power from the motor 2322 and rotate. According to an embodiment, each of the plurality of mopping cloths P may be inserted (or interposed) in a respective one of the pitches of the screws 2321a and 2321b.

According to an embodiment, the plurality of mopping cloths P received may be moved (e.g., moving forward/rearward) in the horizontal direction by the rotation of the screws 2321a and 2321b. In an embodiment, if the screws 2321a and 2321b are rotated (e.g., rotated forward) by the operation of the motor 2322, each mopping cloth P may be moved forward (e.g., F direction) along the horizontal direction by the rotation of the screws 2321a and 2321b. In this case, each mopping cloth P may approach or reach the outlet 231. According to an embodiment, if the screws 2321a and 2321b are rotated (e.g., reverse rotation) by the operation of the motor 2322, each mopping cloth P may be moved rearward (e.g., R direction) along the horizontal direction by the rotation of the screws 2321a and 2321b. In this case, each mopping cloth P may move away from the outlet 231.

According to an embodiment, the mopping cloth transporting unit 232 may include a first transporting unit 232a and a second transporting unit 232b. According to an embodiment, a barrier rib 233 may be disposed between the first transporting unit 232a and the second transporting unit 232b. In this case, the first transporting unit 232a and the second transporting unit 232b may be partitioned left and right inside the mopping cloth receiving space S2 by the barrier rib 233. The first transporting unit 232a and the second transporting unit 232b may correspond to each other in operation, structure, and shape.

According to an embodiment, a mopping cloth detection sensor 237 for detecting the presence of the mopping cloth P received in the mopping cloth supply unit 230 may be disposed in the mopping cloth supply unit 230. The mopping cloth detection sensor 237 may be, e.g., a distance sensor for detecting the distance from the mopping cloth P inserted/interposed in the transporting unit 232a or 232b. In this case, the docking station 200 may calculate the distance from the mopping cloth P inserted/interposed in the transporting unit 232a or 232b through the mopping cloth detection sensor 237 and determine the presence or absence of the mopping cloth P inserted/interposed in the transporting unit 232a or 232b based on the calculated value. According to an embodiment, the docking station 200 may include an alarm providing unit (not shown) that provides an alarm regarding the shortage of mopping cloths to the user upon detecting the absence of the mopping cloth P in the mopping cloth supply unit 230 by the mopping cloth detection sensor 237. The alarm providing unit may be implemented as, e.g., a device such as a voice output unit or a display output unit.

According to an embodiment, the mopping cloth detection sensor 237 may be disposed adjacent to the outlet 231. In this case, the mopping cloth detection sensor 237 may detect whether the mopping cloth P dischargeable through the outlet 231 when the transporting unit 232a or 232b is rotated is inserted/interposed in the transporting unit 232a or 232b.

Although not shown in the drawings, a pair of mopping cloth detection sensors 237 may be provided on two opposite inner surfaces of the mopping cloth supply unit 230, but the disclosure is not limited thereto. Further, there may be provided a plurality of mopping cloth detection sensors 237, and each mopping cloth detection sensor 237 may detect the presence of the mopping cloth P inserted/interposed in the pitch of the transporting unit 232a or 232b corresponding to the position where each mopping cloth detection sensor is disposed. In this case, upon detecting that the number of mopping cloths P received in the mopping cloth supply unit 230 is a predetermined number or less, the docking station 200 may provide a notification regarding the shortage of mopping cloths to the user through the alarm providing unit.

According to an embodiment, slide sections SL1 and SL2 where the mopping cloth P discharged from the outlet 231 slides may be formed over the docking unit 212. According to an embodiment, ends of the slide sections SL1 and SL2 may be connected to the outlet 231. According to an embodiment, the slide sections SL1 and SL2 may be provided to have predetermined curvature.

According to an embodiment, at least one roller 250a and 250b may be disposed on the slide sections SL1 and SL2. According to an embodiment, the at least one roller 250a and 250b may assist each mopping cloth P discharged from the outlet 231 in smoothly moving along the slide sections SL1 and SL2 through rolling.

According to an embodiment, the mopping cloth guide unit 240 may be disposed on the slide sections SL1 and SL2 of the docking unit 212. According to an embodiment, the mopping cloth guide unit 240 may guide the movement of the mopping cloth P to allow each mopping cloth P discharged from the outlet 231 to be seated in the mopping cloth attachment position PP1 or PP2 along the slide sections SL1 and SL2.

According to an embodiment, the mopping cloth guide unit 240 may include guide ribs 241a and 241b and a partitioning rib 242. According to an embodiment, the guide ribs 241a and 241b may be configured to allow each mopping cloth P discharged from the mopping cloth supply unit 230 through the outlet 231 to be positioned in the mopping cloth attachment positions PP1 and PP2. According to an embodiment, the guide ribs 241a and 241b may extend from the outlet 231 along the slide sections SL1 and SL2. According to an embodiment, the guide ribs 241a and 241b may protrude in the direction perpendicular to the upper surface of the docking unit 212. According to an embodiment, the guide ribs 241a and 241b may extend from the outlet 231 to the mopping cloth attachment positions PP1 and PP2 along the path. According to an embodiment, the guide ribs 241a and 241b may be configured to surround the mopping cloth attachment positions PP1 and PP2 or each mopping cloth P positioned in the mopping cloth attachment positions PP1 and PP2.

According to an embodiment, the mopping cloth guide unit 240 may include a first guide rib 241a and a second guide rib 241b. According to an embodiment, ends of the first guide rib 241a and the second guide rib 241b may be formed in a shape partially corresponding to the mopping cloth P to allow the mopping cloth P to be seated in the mopping cloth attachment positions PP1 and PP2. For example, the ends of the first guide rib 241a and the second guide rib 241b may be formed in a semi-circular shape. The first guide rib 241a and the second guide rib 241b may correspond to each other in operation, structure, and shape.

According to an embodiment, the partitioning rib 242 may be disposed between the first guide rib 241a and the second guide rib 241b. According to an embodiment, the partitioning rib 242 may partition the slide sections SL1 and SL2 into a first slide section SL1 and a second slide section SL2. Here, the first slide section SL1 may mean a section where the mopping cloth P discharged through the outlet 231 by the first transporting unit 232a is moved up to the first attachment position PP1. Here, the second slide section SL2 may mean a section where the mopping cloth P discharged through the outlet 231 by the second transporting unit 232b is moved up to the second attachment position PP2. In this case, the first guide rib 241a and the partitioning rib 242 may form the first slide section SL1, and the second guide rib 241b and the partitioning rib 242 may form the second slide section SL2.

According to an embodiment, the partitioning rib 242 may extend from the outlet 231 along the slide sections SL1 and SL2. According to an embodiment, the partitioning rib 242 may protrude in a direction perpendicular to the upper surface of the docking unit 212. According to an embodiment, the partitioning rib 242 may be disposed a predetermined interval away from the guide rib 241a or 241b. In this case, the interval between the partitioning rib 242 and the guide rib 241a or 241b may form a cleaner seating position WP where the first sub wheel 132 of the robotic vacuum cleaner 100 is seated while a new mopping cloth P is attached to the mopping cloth P of the robotic vacuum cleaner 100.

According to an embodiment, a wheel guide unit 243 may be disposed on the docking unit 212. According to an embodiment, the wheel guide unit 243 may be configured to reduce interference by the guide ribs 241a and 241b that may occur while the robotic vacuum cleaner 100 moves to the mopping cloth attachment positions PP1 and PP2.

According to an embodiment, the wheel guide unit 243 may be connected to the guide ribs 241a and 241b. In an embodiment, the wheel guide unit 243 may be formed to be inclined in the moving direction (e.g., F direction) of the robotic vacuum cleaner 100. In an embodiment, the wheel guide unit 243, along with the guide ribs 241a and 241b, may form a path along which the first sub wheel 132 of the robotic vacuum cleaner 100 moves. In this case, the robotic vacuum cleaner 100 moving along the docking unit 212 may reach the cleaner seating position WP via the guide ribs 241a and 241b through the wheel guide unit 243.

According to an embodiment, charging terminals 2111a and 2111b contacting the charging terminals 1111a and 1111b of the robotic vacuum cleaner 100 may be provided on two opposite inner surfaces of the main body unit 211. In an embodiment, the charging terminals 2111a and 2111b may be disposed on two opposite inner surfaces of the main body unit 211 to face the side portions of the robotic vacuum cleaner 100 in a state in which the robotic vacuum cleaner 100 is seated in the mopping cloth attachment positions PP1 and PP2.

Figure 9:
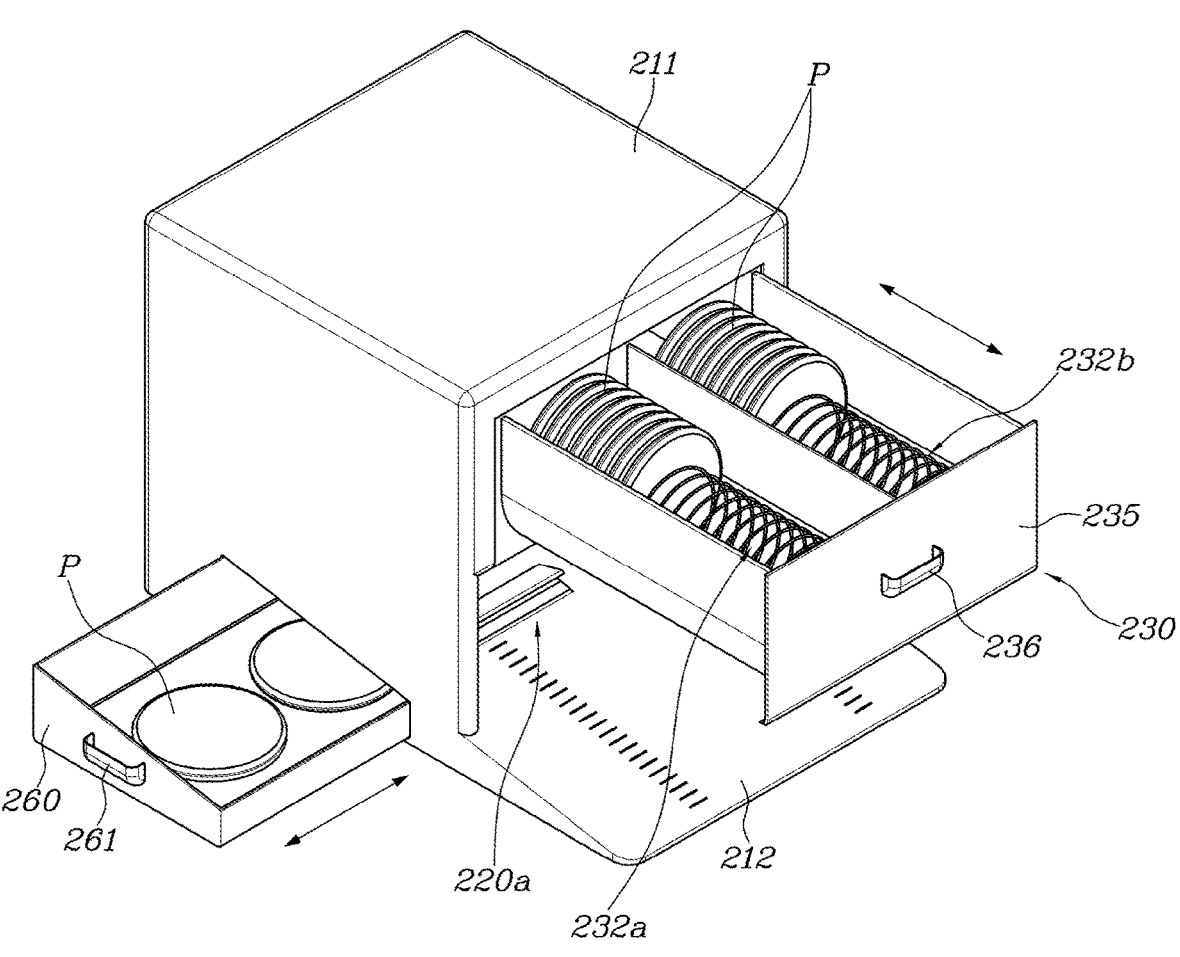
FIG. 9 is a view illustrating a drawer-type wet mopping cloth recovery structure and a drawer-type supply structure of a docking station according to an embodiment.
Figure 10:
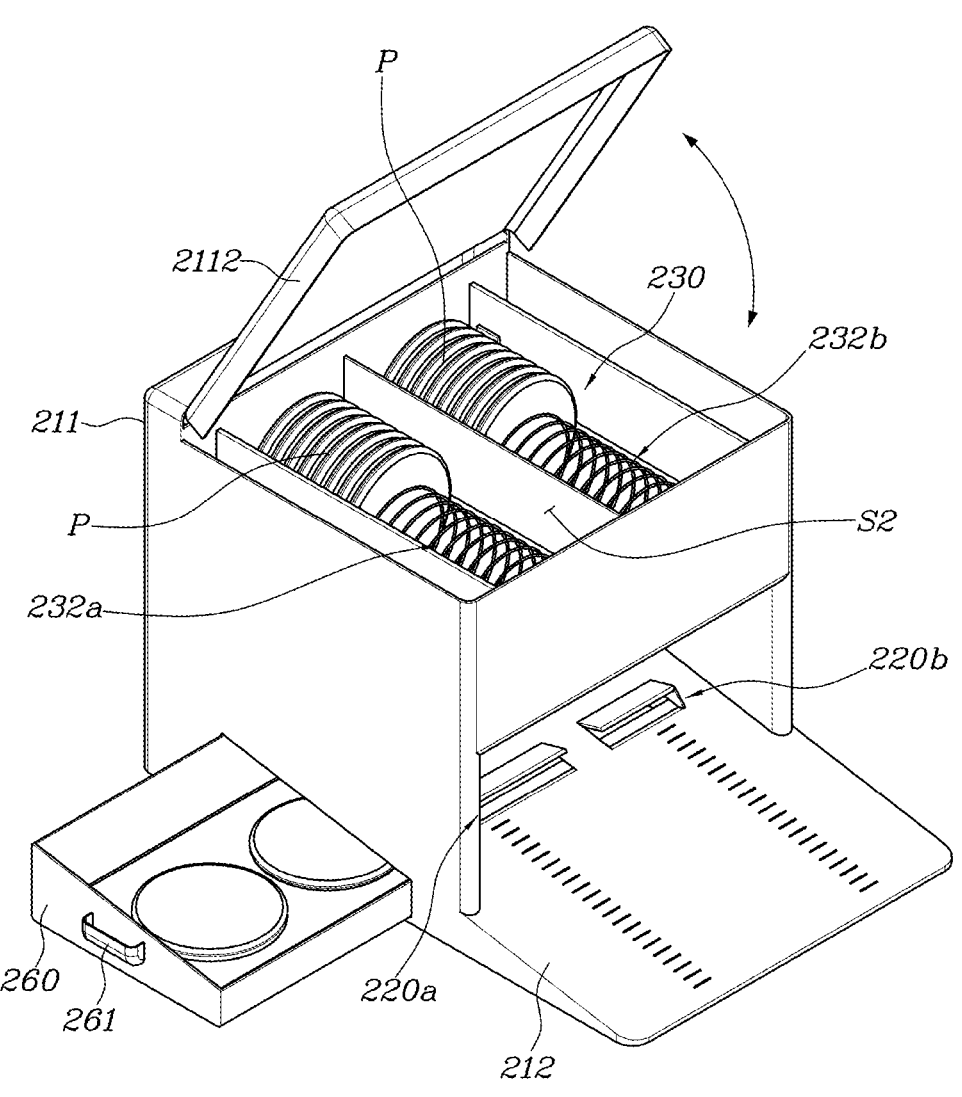
FIG. 10 is a view illustrating a drawer-type wet mopping cloth recovery structure and a cover-type supply structure of a docking station according to an embodiment.

FIG. 9 is a view schematically illustrating a configuration of a docking station having a drawer-type mopping cloth recovery unit and a drawer-type mopping cloth supply unit according to an embodiment. FIG. 10 is a view schematically illustrating a docking station having a drawer-type mopping cloth recovery unit and a cover-type mopping cloth supply unit according to an embodiment.

Referring to FIG. 9, in an embodiment, the docking station 200 may include a drawer-shaped mopping cloth recovery unit 260 that may be drawn out from one side portion thereof. According to an embodiment, each mopping cloth removed from the mopping cloth removing unit 220a or 220b of the docking unit 212 may be inserted into the mopping cloth recovery space S1 at the underside of the docking unit 212 through the opening 214. According to an embodiment, the drawer-shaped mopping cloth recovery unit 260 for receiving the inserted mopping cloth may be disposed in the mopping cloth recovery space S1. According to an embodiment, the drawer-shaped mopping cloth recovery unit 260 may be configured to be drawn out from one side portion of the docking unit 212. According to an embodiment, the drawer-shaped mopping cloth recovery unit 260 may be provided to be drawn out from one side portion of the docking unit 212. According to an embodiment, a handle 261 to be gripped by the user may be disposed on one side portion of the drawer-shaped mopping cloth recovery unit 260. In this case, the user may grip the handle 261 to draw out the drawer-shaped mopping cloth recovery unit 260, recovering the mopping cloth P received in the drawer-shaped mopping cloth recovery unit 260.

According to an embodiment, a sterilizer (not shown) may be disposed in the drawer-shaped mopping cloth recovery unit 260. In an embodiment, the sterilizer may be configured to sterilize/deodorize the mopping cloth P received in the drawer-shaped mopping cloth recovery unit 260. The sterilizer may be, e.g., an ultraviolet (UV) sterilizer, but the disclosure is not limited thereto.

According to an embodiment, the docking station 200 may include the drawer-shaped mopping cloth supply unit 235 at an upper side of the main body unit 211. According to an embodiment, the drawer-shaped mopping cloth supply unit 235 may be drawn out from an upper side portion of the main body unit 211 of the docking station 200. According to an embodiment, the drawer-shaped mopping cloth supply unit 235 may be drawn out from one side portion corresponding to the inlet 211*a* for entry/exit of the robotic vacuum cleaner 100, but the disclosure is not limited thereto. According to an embodiment, the drawer-shaped mopping cloth supply unit 235 may be disposed in the mopping cloth receiving space S2 for receiving the mopping cloth P. According to an embodiment, a handle 236 to be gripped by the user may be disposed on one side portion (e.g., the side portion where it is drawn out) of the drawer-shaped mopping cloth supply unit 235. In this case, the user may grip the handle 236 to draw out the drawer-shaped mopping cloth supply unit 235, supplying the mopping cloth P to the drawer-shaped mopping cloth supply unit 235.

Referring to FIG. 10, in an embodiment, the docking station 200 may include a supply unit cover 2112 formed on an upper surface of the mopping cloth supply unit 230 or the main body unit 211. According to an embodiment, the supply unit cover 2112 may have a hinge disposed long in one side area of the upper surface of the mopping cloth supply unit 230 or the main body unit 211. According to an embodiment, the supply unit cover 2112 may include a hinge (not shown) extending on the upper surface of the main body unit 211 in a left/right direction (e.g., Le direction or Ri direction). According to an embodiment, the supply unit cover 2112 may be opened/closed as it pivots on the hinge. According to an embodiment, the supply unit cover 2112 may be coupled to be rotatable from the main body unit 211 or mopping cloth supply unit 230 about the hinge (not shown).

According to an embodiment, as the supply unit cover 2112 pivots about the hinge, the underneath mopping cloth receiving space S2 and the mopping cloth supply unit 230 may be opened/closed. For example, as shown in FIG. 10, when the supply unit cover 2112 is rotated counterclockwise, the mopping cloth supply unit 230 may be opened to be exposed to the outside, so that the user may insert or add moving control signal to the mopping cloth supply unit 230. For example, when the supply unit cover 2112 is rotated clockwise, the mopping cloth supply unit 230 may be shut off from the outside by the supply unit cover 2112.

Figure 11A:
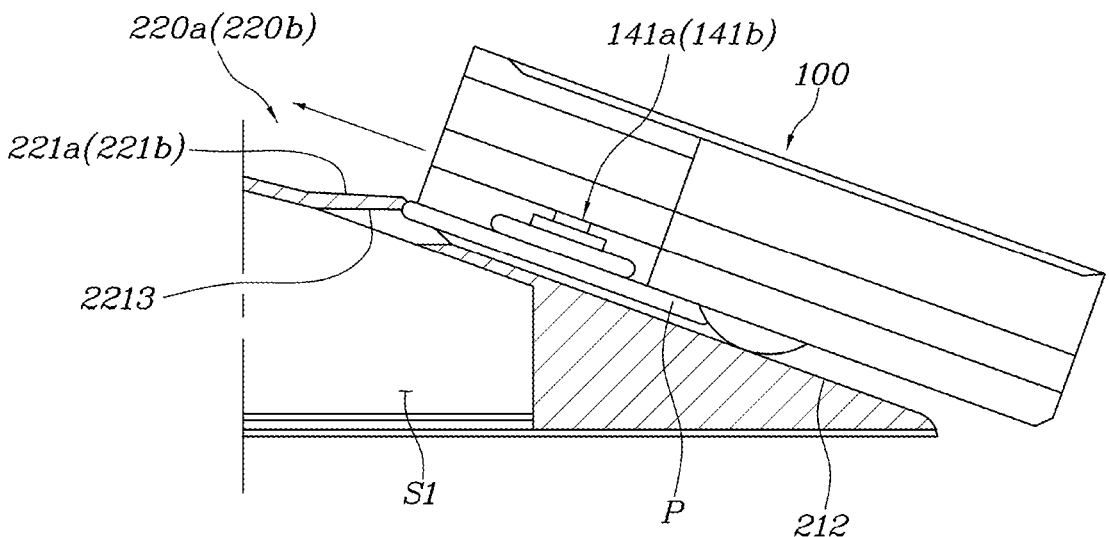
FIGS. 11A and 11B are views illustrating example contexts in which a wet mopping cloth is removed from a robotic vacuum cleaner while passing by a mopping cloth removing unit of a docking station according to an embodiment.
Figure 11B:
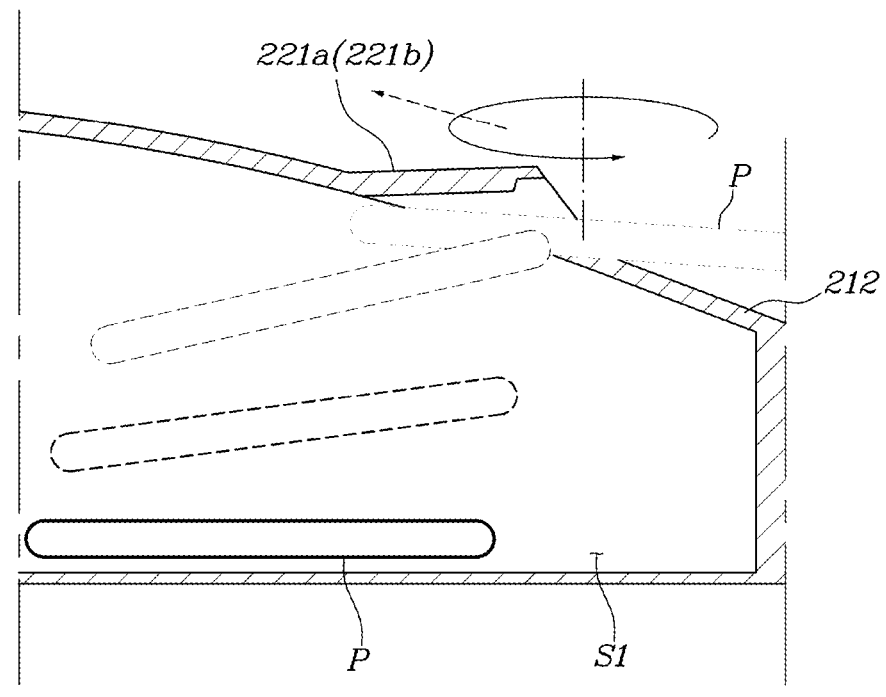

FIGS. 11A and 11B are views illustrating example contexts in which a wet mopping cloth is removed from a robotic vacuum cleaner while passing by a mopping cloth removing unit of a docking station according to an embodiment.

FIG. 11A illustrates a state in which the robotic vacuum cleaner 100 enters the docking station, travels on the docking unit 212, and reaches the mopping cloth removing units 220*a* and 220*b*. As shown, the protrusions 221*a* and 221*b* of the mopping cloth removing units 220*a* and 220*b* protrude from the upper surface of the docking unit 212 while forming a predetermined acute angle from the upper surface of the docking unit 212. As shown, the free end portions of the protrusions 221*a* and 221*b* of the mopping cloth removing units 220*a* and 220*b* are positioned at the edge between the robotic vacuum cleaner 100 and the mopping cloth P attached thereto. Although not shown in FIG. 11A, if the robotic vacuum cleaner 100 keeps on traveling along the entering direction (direction indicated by the arrow), the sharp free end portions of the protrusions 221*a* and 221*b* may poke into the space between the robotic vacuum cleaner 100 and the underneath attached mopping cloth P. Then, the bottom surfaces 2213 of the protrusions 221*a* and 221*b* contact the upper surface of the mopping cloth P, causing frictional force to remove the mopping cloth P from the robotic vacuum cleaner 100.

According to an embodiment, the robotic vacuum cleaner 100 may be operated to rotate the rotating plates 141*a* and 141*b* upon detecting proximity or contact to the protrusions 221*a* and 221*b* while traveling. In such a case, the robotic vacuum cleaner 100 may remove the mopping cloth P more easily by the rotational force of the rotating plates 141*a* and 141*b* in addition to the driving force of the robotic vacuum cleaner 100 that travels in the entering direction.

According to an embodiment, the docking station 200 may remove the mopping cloth P from the robotic vacuum cleaner 100 using only the robotic vacuum cleaner 100's own power (e.g., linear power and/or rotational power) without providing separate power, through the protrusions 221*a* and 221*b* of the mopping cloth removing units 220*a* and 220*b*.

According to an embodiment, the mopping cloth P removed from the underside of the robotic vacuum cleaner 100 by the protrusions 221*a* and 221*b* may be inserted downward of the bottom surfaces 2213 of the protrusions 221*a* and 221*b*. Thereafter, the mopping cloth P removed from the robotic vacuum cleaner 100 may be put and received in the mopping cloth recovery space S1 provided inside the docking unit 212 of the docking station 200 through the opening 214 formed under the bottom surfaces 2213 of the protrusions 221*a* and 221*b*. FIG. 11B illustrates a moving path where the mopping cloth P removed from the robotic vacuum cleaner 100 is put and received in the mopping cloth recovery space S1. According to an embodiment, for example, the above-described drawer-type mopping cloth recovery unit 260 may be disposed in the mopping cloth recovery space S1, but the disclosure is not limited thereto.

Figure 12A:
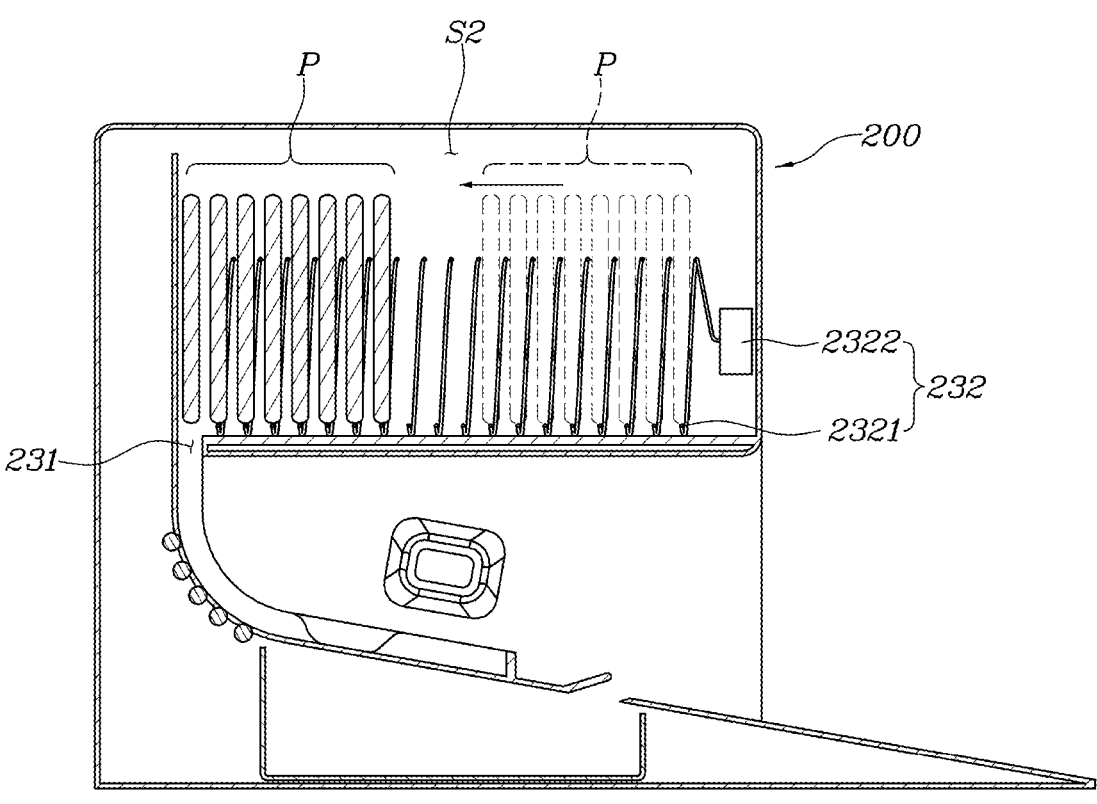
FIGS. 12A and 12B are side views illustrating a change in context when an unused wet mopping cloth is supplied from a mopping cloth supply unit to a mopping cloth attachment position according to an embodiment.
Figure 12B:
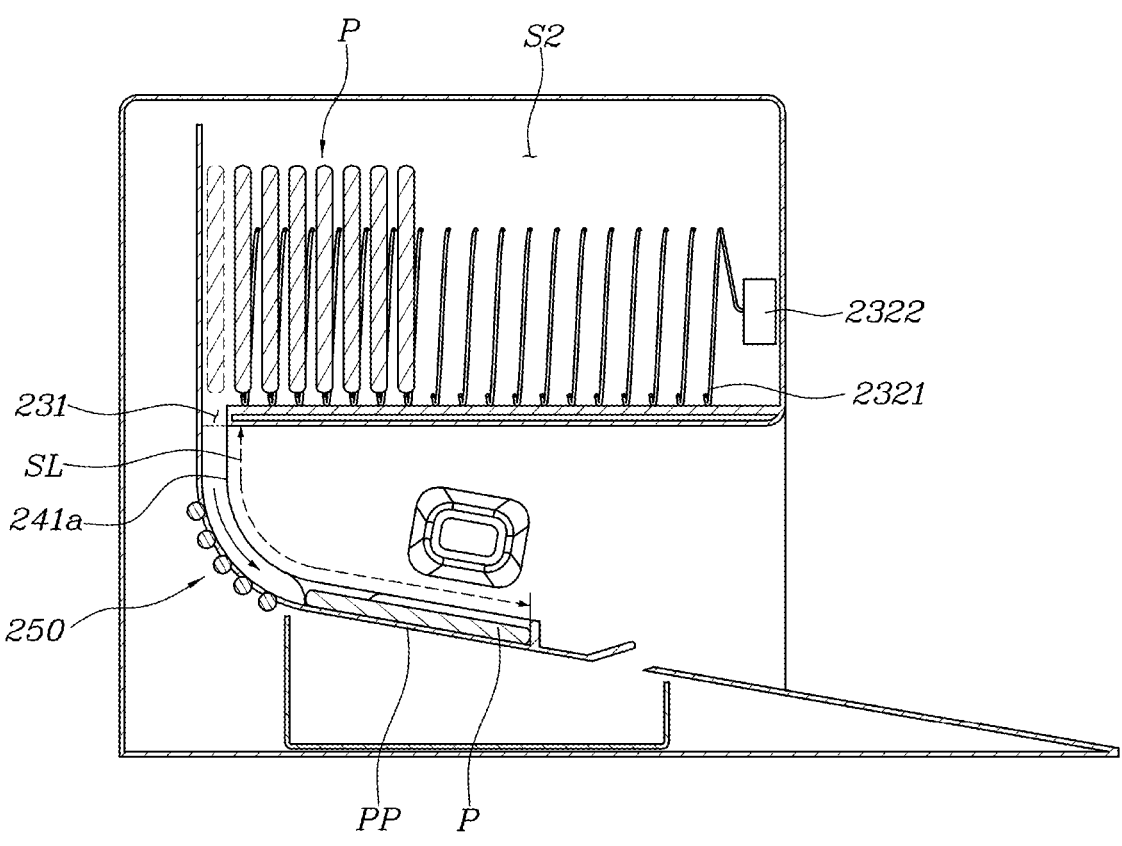

FIGS. 12A and 12B are side views illustrating a change in context when a mopping cloth is supplied from a mopping cloth supply unit to a mopping cloth attachment position in a docking station 200.

In an embodiment, although not specifically shown, the docking station 200 may include a first detection unit for detecting the presence or absence of the mopping cloth P in the mopping cloth attachment positions PP1 and PP2 of the docking unit 212. In an embodiment, the docking station 200 may include a sensor for detecting the presence or absence of a mopping cloth on the mopping cloth attachment positions PP1 and PP2. In an embodiment, upon detecting the absence of a mopping cloth P in the mopping cloth attachment positions PP1 and PP2, the docking station 200 may control the motor 2322 of the mopping cloth transporting unit 232 to rotate the screw 2321. The mopping cloth P inserted/interposed in the screw 2321 may be moved forward by the rotation of the screw 2321. According to an embodiment, when the docking station 200 rotates the screw 2321 to move forward unused mopping cloths P inserted/interposed in the screw 2321, the unused mopping cloths P inserted/interposed in the screw 2321 may move from the rear of the mopping cloth receiving space S2 to the front of the mopping cloth receiving space S2, so that the unused mopping cloth P inserted/interposed in the foremost unused mopping cloth P inserted/interposed in the screw 2321 may be positioned above the outlet 231. In this case, the docking station 200 may control the motor 2322 of the mopping cloth transporting unit 232 to stop the rotation of the screw 2321.

In an embodiment, although not specifically shown, the docking station 200 may include a second detection unit for detecting whether the robotic vacuum cleaner 100 is positioned properly in the mopping cloth attachment positions PP1 and PP2 of the docking unit 212. In an embodiment, the docking station 200 may include a sensor for detecting whether the robotic vacuum cleaner 100 is seated on the mopping cloth attachment positions PP1 and PP2. In an embodiment, upon detecting that the robotic vacuum cleaner 100 is seated in the mopping cloth attachment positions PP1 and PP2 and that no mopping cloth P is present in the mopping cloth attachment positions PP1 and PP2 by the first detection unit, the docking station 200 may control the motor 2322 of the mopping cloth transporting unit 232 to rotate the screw 2321. The mopping cloth P inserted/interposed in the screw 2321 may be moved forward by the rotation of the screw 2321. According to an embodiment, when the docking station 200 rotates the screw 2321 to move forward unused mopping cloths P inserted/interposed in the screw 2321, the unused mopping cloths P inserted/interposed in the screw 2321 may move from the rear of the mopping cloth receiving space S2 to the front of the mopping cloth receiving space S2, so that the unused mopping cloth P inserted/interposed in the foremost unused mopping cloth P inserted/interposed in the screw 2321 may be positioned above the outlet 231. In this case, the docking station 200 may control the motor 2322 of the mopping cloth transporting unit 232 to stop the rotation of the screw 2321.

Thereafter, as shown in FIG. 12B, the mopping cloth P positioned above the outlet 231 may escape from the screw 2321 and fall downward to pass through the outlet 231. Then, the mopping cloth P having passed through the outlet 231 may move along the slide section SL provided in the docking unit 212. The mopping cloth P may be guided not to deviate to the outside by the guide rib 241 while moving along the slide section SL. The mopping cloth P may be stopped and positioned properly in the mopping cloth attachment position PP by the guide rib 241.

Figure 13A:
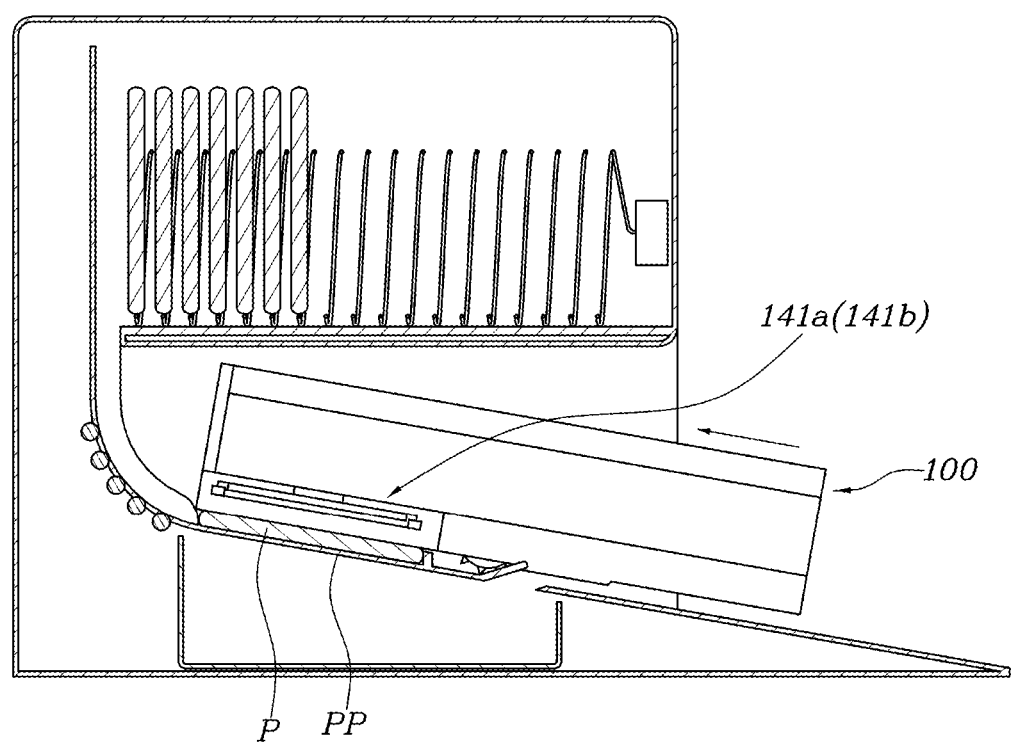
FIGS. 13A and 13B are side views illustrating a change in context when a wet mopping cloth is attached to a robotic vacuum cleaner in a mopping cloth attachment position of a docking station according to an embodiment.
Figure 13B:
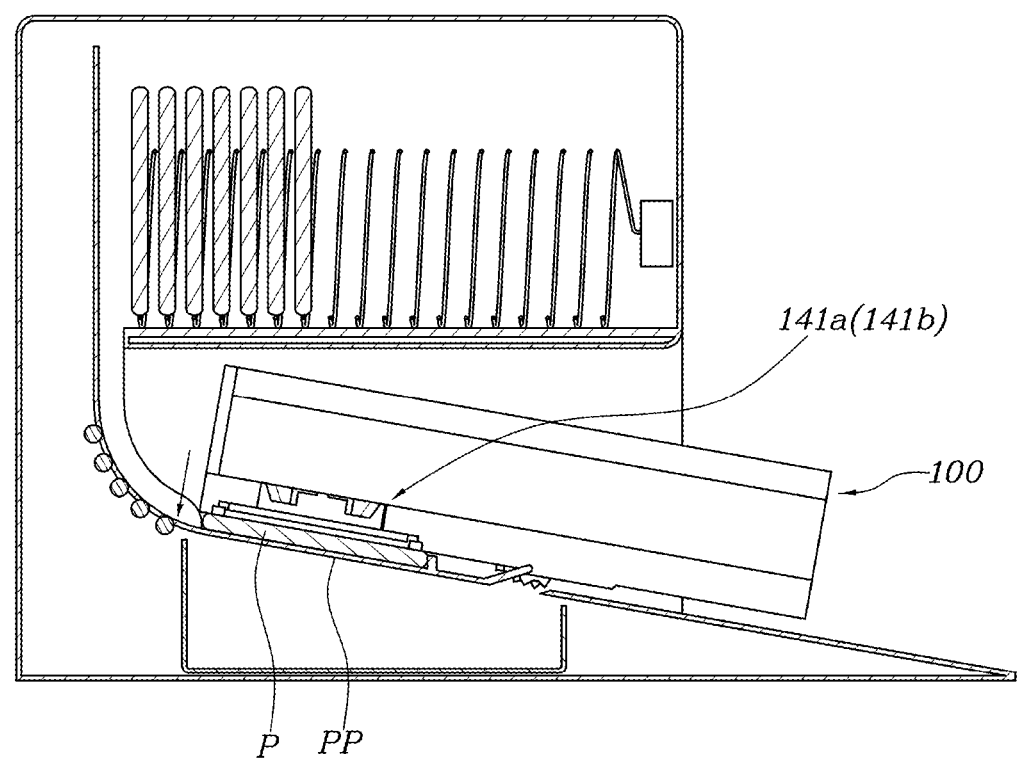

FIGS. 13A and 13B are side views illustrating a change in context when a mopping cloth is attached to a robotic vacuum cleaner in a mopping cloth attachment position of a docking station according to an embodiment. For convenience of description, the internal cross section of the configuration of the mopping cloth unit of the robotic vacuum cleaner is shown.

As shown in FIG. 13A, in an embodiment, the robotic vacuum cleaner 100 is in a state of reaching an upper position of the mopping cloth attachment position PP with no mopping cloth P attached thereto.

According to an embodiment, the robotic vacuum cleaner 100 may detect the arrival at the correct position on the mopping cloth attachment position PP. Upon detecting arrival at the correct position on the mopping cloth attachment position PP, the robotic vacuum cleaner 100 may control the driving unit to move the rotating plates 141a and 141b downward by a predetermined distance as shown in FIG. 13B. According to an embodiment, as shown in FIG. 13B, when the robotic vacuum cleaner 100 controls the driving unit to move the rotating plates 141a and 141b downward, the rotating plates 141a and 141b of the robotic vacuum cleaner 100 may be brought in contact with the mopping cloth P fixed in the mopping cloth attachment position PP by the guide rib 241. In an embodiment, the downward movement of the rotating plate 141a or 141b may be performed within a range in which the rotating plate 141a or 141b applies a force in a predetermined range to the mopping cloth underneath. The mopping cloth P in contact with the rotating plate 141a or 141b may be attached to the rotating plate 141a or 141b by an attaching member provided on the bottom surface of the rotating plate 141a or 141b.

Thereafter, although not shown in FIG. 13B, if the robotic vacuum cleaner 100 lifts the rotating plate 141a or 141b by driving the driving unit, the mopping cloth replacement by the robotic vacuum cleaner 100 may be completed. The robotic vacuum cleaner 100 may be moved in the direction opposite to the entering direction to move away from the docking station 200 and resume cleaning according to the user's command.

The terms as used herein are provided merely to describe some embodiments thereof, but are not intended to limit the disclosure. As used herein, the singular forms "a," "an," and "the" are intended to include the plural forms as well, unless the context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, the term 'and/or' should be understood as encompassing any and all possible combinations by one or more of the enumerated items. As used herein, the terms "include," "have," and "comprise" are used merely to designate the presence of the feature, component, part, or a combination thereof described herein, but use of the term does not exclude the likelihood of presence or adding one or more other features, components, parts, or combinations thereof. As used herein, the terms "first" and "second" may modify various components regardless of importance and/or order and are used to distinguish a component from another without limiting the components.

As used herein, the terms "configured to" may be interchangeably used with the terms "suitable for," "having the capacity to," "designed to," "adapted to," "made to," or "capable of" depending on circumstances. The term "configured to" does not essentially mean "specifically designed in hardware to." Rather, the term "configured to" may mean that a device can perform an operation together with another device or parts. For example, a 'device configured (or set) to perform A, B, and C' may be a dedicated device to perform the corresponding operation or may mean a general-purpose device capable of various operations including the corresponding operation.

Meanwhile, the terms "upper side", "lower side", and "front and rear directions" used in the disclosure are defined with respect to the drawings, and the shape and position of each component are not limited by these terms.

In the disclosure, the above-described description has been made mainly of specific embodiments, but the disclosure is not limited to such specific embodiments, but should rather be appreciated as covering all various modifications, equivalents, and/or substitutes of various embodiments.

What is claimed is:

1. A docking station for a robotic vacuum cleaner comprising:

a docking unit having a traveling path for the robotic vacuum cleaner to enter the docking station and travel to a mopping cloth attachment position at which a mopping cloth is attachable to the robotic vacuum cleaner; and a mopping cloth supply unit disposed above the docking unit and configured to hold a plurality of mopping cloths in substantially vertical orientation and side by side in parallel alignment along a horizontal direction, wherein the mopping cloth supply unit includes a mopping cloth transporting unit that is configured so that the mopping cloth transporting unit sequentially transports each mopping cloth of the plurality of mopping cloths received by the mopping cloth supply unit along the horizontal direction above the robot cleaner to an outlet above the robot cleaner to be discharged through the outlet to the mopping cloth attachment position.

2. The docking station of claim 1, wherein the mopping cloth transporting unit includes:

a motor; and a screw rotatably drivable by the motor and having a spiral structure that extends along the horizontal direction.

3. The docking station of claim 2, wherein the screw has a plurality of pitches and is configured so that each mopping cloth of the plurality of mopping cloths is insertable into a respective pitch of the plurality of pitches.

4. The docking station of claim 1, wherein the docking unit includes a mopping cloth guide unit on an upper surface of the docking unit and configured to guide each mopping cloth of the plurality of mopping cloths discharged through the outlet to be positioned in the mopping cloth attachment position.

5. The docking station of claim 4, wherein the mopping cloth guide unit includes a guide rib protruding from the upper surface of the docking unit to guide each mopping cloth of the plurality of mopping cloths discharged through the outlet to the mopping cloth attachment position.

6. The docking station of claim 4, wherein the mopping cloth guide unit includes at least one roller on the upper surface of the docking unit to guide each mopping cloth of the plurality of mopping cloths discharged through the outlet to the mopping cloth attachment position.

7. The docking station of claim 1, wherein the mopping cloth supply unit includes a supply unit cover pivotably coupled to an upper surface of the mopping cloth supply unit and pivotable to open or close at least a portion of the mopping cloth supply unit.

8. The docking station of claim 1, wherein the mopping cloth supply unit includes a drawer that contains at least a portion of the mopping cloth transporting unit and that may be drawn out from the mopping cloth supply unit.

9. The docking station of claim 1, further comprising:

a mopping cloth detection sensor configured to detect a number of the mopping cloths of the plurality of mopping cloths present in the mopping cloth supply unit; and an alarm providing unit configured to provide an alarm when the mopping cloth detection sensor detects that the number of mopping cloths of the plurality of mopping cloths present in the mopping cloth supply unit is a predetermined number or less.

10. The docking station of claim 1, further comprising:

a mopping cloth removing unit having at least one protrusion protruding from an upper surface of the docking unit, and configured, so that, when a mopping cloth is attached to the robotic vacuum cleaner while the robotic vacuum cleaner travels along the traveling path, at least a portion of the at least one protrusion becomes inserted into a space between the robotic vacuum cleaner and the mopping cloth to remove the mopping cloth from the robotic vacuum cleaner.

11. The docking station of claim 10, wherein the at least one protrusion has a wedge shape forming a predetermined acute angle from the upper surface of the docking unit.

12. The docking station of claim 10, wherein the docking unit includes an opening at least a portion of which is positioned under the at least one protrusion, so that the removed mopping cloth is inserted through the opening into the docking unit.

13. The docking station of claim 10, wherein the at least one protrusion has a first protrusion and a second protrusion each protruding from the upper surface of the docking unit and spaced apart from each other by a predetermined interval.

14. The docking station of claim 12, further comprising:

a mopping cloth recovery unit within the docking unit and configured to receive the mopping cloth inserted through the opening.

15. A cleaning system comprising:

a robotic vacuum cleaner; and a docking station including:

a docking unit having a traveling path for the robotic vacuum cleaner to enter the docking station and travel to a mopping cloth attachment position, and a mopping cloth supply unit disposed above the docking unit and configured to hold a plurality of mopping cloths in substantially vertical orientation and side by side in parallel alignment along a horizontal direction, wherein the mopping cloth supply unit includes a mopping cloth transporting unit that is configured so that the mopping cloth transporting unit sequentially transports each mopping cloth of the plurality of mopping cloths received by the mopping cloth supply unit along the horizontal direction above the robot cleaner to an outlet above the robot cleaner to be discharged through the outlet to the mopping cloth attachment position, and the robotic vacuum cleaner is configured to, when the robotic vacuum cleaner is at the mopping cloth attachment position with a mopping cloth that was discharged through the outlet being at the mopping cloth attachment position, attach the mopping cloth to the robotic vacuum cleaner.

16. The cleaning system of claim 15, wherein the mopping cloth supply unit includes:

a motor; and a screw rotatably drivable by the motor and having a spiral structure that extends along the horizontal direction to sequentially transport each mopping cloth of the plurality of mopping cloths received in the mopping cloth supply unit along the horizontal direction.

17. The cleaning system of claim 15, wherein the docking station includes at least one guide rib protruding from an upper surface of the docking unit and at least one roller in the upper surface of the docking unit, the at least one guide rib and the at least one roller configured to guide each mopping cloth of the plurality of mopping cloths discharged from the mopping cloth supply unit to the mopping cloth attachment position.

18. The cleaning system of claim 15, wherein the docking station includes a protrusion protruding from an upper surface of the docking unit, and configured so that, when a mopping cloth is attached to the robotic vacuum cleaner while the robotic vacuum cleaner travels along the traveling path, at least a portion of the protrusion becomes inserted into a space between the robotic vacuum cleaner and the mopping cloth to remove the mopping cloth from the robotic vacuum cleaner before the robotic vacuum cleaner reaches the mopping cloth attachment position.

19. The cleaning system of claim 15, wherein the robotic vacuum cleaner includes a first charging terminal unit, and wherein the docking station includes a second charging terminal unit, so that, when the robotic vacuum cleaner is positioned at the mopping cloth attachment position, the first charging terminal unit contacts the second charging terminal unit to charge the robotic vacuum cleaner.

20. The cleaning system of claim 15, wherein the robotic vacuum cleaner includes a mopping cloth unit to which a mopping cloth is attachable, and the mopping cloth unit is configured to, when the robotic vacuum cleaner reaches the mopping cloth attachment position with no mopping cloth attached to the mopping cloth unit and a mopping cloth that was discharged through the outlet being at the mopping cloth attachment position, descend to contact the mopping cloth at the mopping cloth attachment position, so that the mopping cloth attaches to the mopping cloth unit.

\* \* \* \* \*